United States Patent
Pei et al.

(10) Patent No.: US 12,529,917 B2
(45) Date of Patent: Jan. 20, 2026

(54) PHASE-CHANGING POLYMER FILM FOR BROADBAND SMART WINDOWS APPLICATIONS

(71) Applicant: The Regents of the University of California, Oakland, CA (US)

(72) Inventors: Qibing Pei, Calabasas, CA (US); Yu Xie, Los Angeles, CA (US); Fangyi Guan, Los Angeles, CA (US)

(73) Assignee: THE REGENTS OF THE UNIVERISTY OF CALIFORNIA, Oakland, CA (US)

( * ) Notice: Subject to any disclaimer, the term of this patent is extended or adjusted under 35 U.S.C. 154(b) by 784 days.

(21) Appl. No.: 17/778,586

(22) PCT Filed: Nov. 20, 2020

(86) PCT No.: PCT/US2020/061439
§ 371 (c)(1),
(2) Date: May 20, 2022

(87) PCT Pub. No.: WO2021/102225
PCT Pub. Date: May 27, 2021

(65) Prior Publication Data
US 2023/0019813 A1    Jan. 19, 2023

Related U.S. Application Data

(60) Provisional application No. 62/938,796, filed on Nov. 21, 2019.

(51) Int. Cl.
| | | |
|---|---|---|
| *G02F 1/01* | (2006.01) | |
| *C08F 220/68* | (2006.01) | |
| *C08J 5/18* | (2006.01) | |
| *C08J 7/044* | (2020.01) | |
| *C08J 7/18* | (2006.01) | |
| *G02C 7/10* | (2006.01) | |

(52) U.S. Cl.
CPC .......... *G02F 1/0147* (2013.01); *C08F 220/68* (2013.01); *C08J 5/18* (2013.01); *C08J 7/044* (2020.01); *C08J 7/18* (2013.01); *G02C 7/102* (2013.01); *C08J 2333/08* (2013.01)

(58) Field of Classification Search
CPC .... C08G 18/672; G02F 1/0147; C08F 220/06
See application file for complete search history.

(56) References Cited

U.S. PATENT DOCUMENTS

| | | |
|---|---|---|
| 2012/0234465 A1 | 9/2012 | Wen et al. |
| 2012/0262773 A1 | 10/2012 | Powers et al. |
| 2015/0286073 A1 | 10/2015 | Blum |
| 2015/0329715 A1 * | 11/2015 | Zilles ....................... C09K 9/02 252/500 |
| 2018/0004018 A1 | 1/2018 | Oron et al. |

FOREIGN PATENT DOCUMENTS

JP     2019104139 A  *  6/2019

OTHER PUBLICATIONS

JPO abstract of JP 2019-104139 (Year: 2019).*
Zhang et al Chemically Interconnected Thermotropic Polymers for Transparency-Tunable and Impact-Resistant Windows, ACS Appl. Mater. Interfaces 2019, 11, 5393-5400, Published: Jan. 15, 2019.*
PCT International Search Report and Written Opinion dated Apr. 1, 2021 for PCT Application No. PCT/US20/061439.
Xie et al., "A Phase-Changing Polymer Film for Broadband Smart Window Applications" Macromolecular Rapid Communications; vol. 41, Issue 16; Jul. 21, 2020; entire document; [online] .

* cited by examiner

*Primary Examiner* — Gregory Listvoyb
(74) *Attorney, Agent, or Firm* — GATES & COOPER LLP

(57) ABSTRACT

A smart window including a solid polymer film which is opaque at an ambient temperature and transparent at an elevated temperature; a transparent heater to supply uniform heating to at least a part of the solid polymer film; and a power supply connected to the transparent heater.

23 Claims, 16 Drawing Sheets

PHASE-CHANGING POLYMER FILM FOR BROADBAND SMART WINDOWS APPLICATIONS

CROSS REFERENCE TO RELATED APPLICATIONS

This application claims the benefit under 35 U.S.C. Section 119(e) of commonly-assigned U.S. Provisional Patent Application Ser. No. 62/938,796, filed on Nov. 21, 2019, by Qibing Pei, Yu Xie, and Fangyi Guan, entitled "A PHASE-CHANGING POLYMER FILM FOR BROADBAND SMART WINDOWS APPLICATIONS," which application is incorporated by reference herein.

BACKGROUND OF THE INVENTION

1. Field of the Invention

The present invention relates to phase changing polymers and methods of making the same.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

The global issues of climate change and the rapidly escalating energy consumption have inspired developments for improved efficiency of energy usage. The American Physical Society states that reducing 40% of the energy used in residential and commercial buildings from air conditioning and heating in the United States could potentially cut the total carbon emissions by 30% in the country.[1,2] Smart windows have tunable opacity to regulate solar-irradiation into buildings and residences, and thus can reduce the overall demand for air conditioning and heating. As such, smart windows are considered a must-have for zero-emission buildings.[3,4] Furthermore, smart windows can also be deployed in business and household rooms to improve privacy protection.[5]

Four different technologies have been developed for smart windows based on photochromic, electrochromic, thermochromic and liquid crystalline orientation mechanisms, respectively.[3,6-19] Among these, photochromic and electrochromic smart window materials have limited bandwidth modulation as the absorption spectra of these chromic materials do not cover a broad range of wavelengths.[20-26] Thermochromic smart windows, on the other hand, are capable of wider bandwidth modulation and are gaining interest. Hydrogels, ionic liquids, and liquid crystals have all been investigated as the thermochromic medium[3,14-19] Among these, hydrogels contain water which could encounter water leak and evaporation in long duration operation and storage. Ionic gels were introduced to replace the hydrogels, but the introduction of ions degrades the polymer matrix over time.[27] Polymer-dispersed liquid crystal (PDLC) smart windows operates by orientation of liquid crystals to regulate light transmittance.[18,19] The PDLC typically have limited bandwidth due to their fixed pitches.[26] Cholesteric liquid crystals or stacked liquid crystals with various pitches have been used to expand switchable bandwidth, but they can be cost prohibitive for large area applications in buildings.[19,28,29]

What is needed are improved methods of making smart windows. The present invention satisfies this need.

SUMMARY OF THE INVENTION

The present disclosure describes a smart window comprising a glass, glazing, or film whose light transmission properties are altered when voltage, light or heat is applied. This smart window comprises at least two parts: a smart window (SW) film that has opacity switching ability and a transparent heater that is connected to the SW film. The SW film is opaque at ambient temperature with a parallel transmittance less than 50%. It becomes transparent at elevated temperatures with a parallel transmittance greater than 50%. The transition temperature of the SW film can be controlled to be in the range between 25° C. and 130° C. The thickness of the SW film can be selected from 10 μm up to several millimeters.

The transparent heater comprises a conductive layer, which is in thermal contact with the SW film and is deposited by printing, spraying, casting, physical vapor deposition or chemical vapor deposition. The transparent heater can be heated by applying voltage between two separate locations of the conductive layer.

As illustrated herein, the smart window is opaque at ambient temperature but can be electrically controlled to become transparent by applying a voltage to the heater to generate Joule heat. The transparency of the smart window can be maintained by consistent voltage input to the heater and the opacity of the smart window can be recovered by turning off the heater.

To our knowledge, the present disclosure reports on the first all-solid thermochromic smart window film without the inclusion of any metal/metal oxides or liquid crystals to enable a large light modulation over the whole solar spectrum.

A device, method, and composition of matter according to the present disclosure can be embodied in many ways including, but not limited to, the following (referring also to FIGS. 1-9).

1. A smart window 700, comprising:
   a solid polymer film 702 which is opaque at an ambient temperature and transparent at an elevated temperature;
   a transparent heater 704 thermally coupled or connected to the solid polymer film to supply uniform heating to at least a part of the solid polymer film; and
   a power supply 706 connected to the transparent heater.

2. The smart window of example 1, wherein the solid polymer film:
   is opaque at the ambient temperature with a parallel transmittance less than 50%;
   becomes transparent at the elevated temperature with a parallel transmittance greater than 50%, and
   has a transition temperature that is greater than 30° C. and less than 130° C., wherein the transition temperature is the temperature at which the solid polymer film changes from being opaque to being transparent. In some examples of example 2, the parallel transmittance in is $I_{out}/I_{in}$, where $I_{in}$ is the intensity of the incident light incident on the solid polymer film and $I_{out}$ is the intensity of the light transmitted through the film and measured on the other side along one or more direction within 5 degrees of the direction of the incident light Iin, and the parallel transmittance greater than 50% in the transparent state and less than 50% in the opaque state is measured for all wavelengths of solar radiation or in a range of 500 nm to 2000 nm.

3. The smart window of example 2, wherein:
the solid polymer film includes a phase changing moiety 102,
the phase changing moiety undergoes a phase change at the elevated temperature,
the phase changing moiety has a refractive index changing by at least 0.01 during the phase change, and
the phase change is reversed when the temperature of the solid polymer film is lowered to the ambient temperature.

4. The smart window of example 3, wherein the phase changing moiety 102 comprises:
at least one first compound selected from the group consisting of or comprising hydrocarbon groups including hexadecyl and octadecyl, and
polymer chain segments selected from the group consisting of or including polyacrylate, polycaprolactone, polyethylene-vinyl acetate), polyethylene, poly(cyclooctene), chlorinated polyethylene, chlorosulfonated polyethylene, and their copolymers, and
wherein the first compound is attached as a side chain on the polymer segments.

5. The smart window of example 4, wherein the solid polymer film:
has a phase transition property due to crystal melting or re-crystallization of the phase changing moiety, and
has the transition temperature in a range including temperatures of no more than 20° C.

6. The smart window of example 2, wherein the solid polymer film comprises a first moiety 102 that is relatively hydrophobic and a second moiety 104 that is relatively hydrophilic, and the first moiety is more hydrophobic than the second moiety.

7. The smart window of example 6, wherein the second moiety 104 can be selected from the group comprising ethoxylated acrylate, ethoxylated trimethylolpropane triacrylate, polyethylene glycol) diacrylate, ethoxylated methacrylate, ethoxylated trimethylolpropane trimethacrylate, and poly(ethylene glycol) dimethacrylate.

8. The smart window of example 6, wherein the solid polymer film is prepared by copolymerization of octadecyl acrylate and ethoxylated trimethylolpropane triacrylate.

9. The smart window of example 8, wherein the solid polymer film has a weight ratio of the octadecyl acrylate to the ethoxylated trimethylolpropane triacrylate selected in the range between 1:1 and 6:1.

10. The smart window of example 8, wherein the copolymerization is by a means of ultraviolet (UV) exposure or heating.

11. The smart window of example 6, wherein:
a) the first moiety 102 and the second moiety 104 are phase separated in the solid polymer film so as to form two phases, and
b) at least one of the phases has phase grains larger than 1 micrometer.

12. The smart window of example 6, wherein the first moiety and the second moiety
a) have matching refractive indices (e.g, within 0.5% of each other) above the solid polymer film's transition temperature, and
b) have refractive indices with large difference (e.g., more than 1% different from each other) below the solid polymer film's transition temperature.

13. The smart window of example 2, wherein the solid polymer film comprises at least two separated phases 102, 104, and the opacity switching between the solid polymer film being transparent and the solid polymer film being opaque is caused by a reversible phase transition property of one of the separated phases 102.

14. The smart window of example 13, comprising a high transparency of at least 90% above the transition temperature due to the matching refractive indices of the two different separated phases.

15. The smart window of example 2, wherein a thickness of the solid polymer film is selected in the range from 10 micrometers to 10 millimeters.

16. The smart window of any of the preceding examples, wherein the heater is transparent with parallel transparency in the range of 80% to 100%. In some examples of example 16, the parallel transparency is $100 \times I_{out}/I_{in}$, where $I_{in}$ is the intensity of the incident light incident on the solid polymer film and $I_{out}$ is the intensity of the light transmitted through the film and measured on the other side along one or more direction within 5 degrees of the direction of the incident light $I_{in}$, and the parallel transparency in the range of 80%-100% is measured for all (or a subset of) wavelengths of solar radiation/sunlight or in a range of 500 nm to 2000 nm.

17. The smart window of any of the preceding examples, wherein the heater comprises a transparent conductive layer 400, 704 that is deposited by printing, spraying, casting, physical vapor deposition, or chemical vapor deposition.

18. The smart window of example 17, wherein the transparent conductive layer comprises at least one of transparent conductive material 402 including an ultrathin metal coating, metal nanowires 402, carbon nanotubes, graphene, or indium tin oxide.

19. The smart window of examples 17 or 18, wherein the transparent conductive layer is:
a) deposited on the solid polymer film 702 comprising the phase changing moiety 102,
b) deposited on a transparent rigid substrate 404, including a glass sheet or an acrylic sheet,
c) deposited on a transparent flexible substrate 404, including ultrathin glass and one or more transparent polymer films, or
d) comprises a material 402 (e.g., nanowires) embedded in a transparent flexible substrate including one or more polymer films 412.

20. The smart window of any of the preceding examples 17-19, wherein the transparent heater is heated when a voltage is applied between two separated points on the transparent conductive layer.

21. The smart window of any of the preceding examples 1-20, wherein the smart window:
a) is used as a thin sheet or conformed on a flat or curved surface,
b) is opaque at the ambient temperature,
c) is electrically controlled to become transparent when heated above a transition temperature,
d) has the transparency maintained with continuous heating, and
e) has the opacity reversed when the heater is switched off.

22. A method of fabricating the transparent conductive layer of examples 17-21, comprising:
a) depositing a conductive material coating 402 on a release substrate 404;
b) applying a polymer precursor layer 408 (monomer precursor for the SW film or a different precursor, e.g., PUA) over the conductive material coating 402;

c) curing the polymer precursor layer 408 to form a heater comprising the solid polymer film 702 (comprising the phase changing moiety) or a second different solid polymer film 412 (e.g., PUA); and d) separating the cured second solid polymer film 412 or solid polymer film 702, SW from the release substrate 404, so that the transparent conductive layer 704 comprises an embedded conductive layer 402. Thus, for example, the polymer to embed the heater electrode may be the SW film or a different polymer such as PUA.

23. A method to make the smart window of any of the examples 1-22, comprising:
    a) homogeneously mixing two different monomers so as to form a mixture;
    b) applying the mixture on top of the transparent heater;
    c) curing the mixture by or using ultraviolet LTV light or heat so as to form the solid polymer film; and
    d) applying electrical contacts to the transparent heater 704.

24. A method to make the smart window of any of the examples 1-23, comprising:
    a) depositing a transparent conductive material 402 coating on a release substrate 404;
    b) homogeneously mixing two different monomers so as to form a mixture;
    c) applying the mixture on top of the transparent conductive material coating 402,
    d) curing the mixture by or using ultraviolet (UV) light or heat so as to form the solid polymer film 702, SW comprising a cured polymer film;
    e) separating the cured polymer film 702, SW, with the transparent conductive material coating 402 from the release substrate 404; and
    f) applying electrical contacts to the transparent conductive material coating.

25. A composition of matter 100, comprising:
    a first polymer 102 comprising a phase changing polymer that reversibly switches between a semi-crystalline state and an amorphous state with temperature; and
    a second polymer 104 combined with the first polymer, wherein the first polymer is more hydrophobic than the second polymer so that the second polymer and the first polymer are phase separated, wherein:
    the first polymer comprises first domains 106 having a largest dimension (e.g., largest width 108 and/or largest height) in a range of 2-10 micrometers (μm) and/or sized to scatter-infrared light through scattering,
    the first domains are separated from each other by second domains 110 comprising stripes or bands including the second polymer, and
    the stripes or bands have a largest dimension (e.g., largest width 112 and/or largest height) of less than 2 micrometers and/or are dimensioned to scatter visible electromagnetic radiation wavelengths through scattering, so that a surface 750 of the composition of matter has a roughness of at least 5 micrometers over an area of at least 1 centimeter (cm) by 1 cm.

26. The composition of matter of example 25, wherein:
    the first polymer has a transition temperature above which the first polymer is in the amorphous state,
    the second polymer and the first polymer have matching refractive indices (within 5%) above the transition temperature; and
    the second polymer and the first polymer have refractive indices with a large difference (more than 50% difference) below the transition temperature.

27. The composition of matter of any of the examples 25-26 wherein the first polymer is:
    opaque with a parallel transmittance less than 50% at an ambient temperature and transparent at an elevated temperature, and
    transparent with the parallel transmittance greater than 50% at the elevated temperature; wherein the ambient temperature is 30° C. or less and the elevated temperature is above 30° C. In some examples of example 27, the parallel transmittance in is $I_{out}/I_{in}$, where fin is the intensity of the incident light incident on the solid polymer film and $I_{out}$ is the intensity of the light transmitted through the film and measured on the other side along one or more direction within 5 degrees of the direction of the incident light Iin, and the parallel transmittance greater than 50% in the transparent state and less than 50% in the opaque state is measured for all wavelengths of solar radiation/sunlight or all (or a subset of) wavelengths in a range of 500 nm to 2000 nm.

28. The composition of matter of any of the examples 25-27, wherein the first polymer comprises a first acrylate and the second polymer comprises a second acrylate, and the second polymer is an oligomer.

29. The composition of matter of any of the examples 25-28, wherein the composition comprises a copolymer consisting essentially of the first polymer and the second polymer, or the first polymer copolymerized with the second polymer.

30. The composition of matter of any of the examples 25-29, wherein the second polymer comprises a crosslinker crosslinking the first polymers.

31. The composition of matter of any of the examples 25-30, wherein the first polymer comprises:
    polymer chain segments comprising at least one compound selected from a polyacrylate, a polycaprolactone, poly(ethylene-vinyl acetate), a polyethylene, a poly(cyclooctene), a chlorinated polyethylene, chlorosulfonated polyethylene, and their copolymers or copolymers thereof; and
    hydrocarbon groups comprising a hexadecyl or a octadecyl, wherein the hydrocarbon groups are attached as side chains to the polymer chain segments.

32. The composition of matter of any of the examples 25-31, wherein the second polymer comprises at least one compound selected from ethoxylated acrylate, ethoxylated trimethylolpropane triacrylate, polyethylene glycol) diacrylate, ethoxylated methacrylate, ethoxylated trimethylolpropane trimethacrylate, and polyethylene glycol) dimethacrylate.

33. The composition of matter of any of the examples 25-32, comprising a weight ratio of the first polymer to the second polymer in a range of 1:1 to 6:1.

34. The composition of matter of any of the examples 25-33, wherein a weight ratio of the first polymer to the second polymer is tailored so the domains of the first polymer are semi crystalline and the composition of matter Mie scatters infrared light comprising the infrared wavelengths.

35. The composition of matter of any of the examples 25-34, cast using solution processing on a substrate.

36. The composition of matter of any of the examples 25-32, wherein the first polymer and the second polymer are homogenously mixed using a solution.

37. The composition of matter of examples 25-36, comprising a solid state homogenous mixture of the first polymer and the second polymer.

38. The composition of matter or smart window of any of the examples 1-37, wherein the parallel transmittance of the solid polymer film when the polymer solid film is opaque is at least 70% lower as compared to the parallel transmittance of the solid polymer film when the solid polymer film is transparent at the elevated temperature, for all wavelengths of solar radiation or sunlight, or for all (or a subset of) wavelengths in a range of 500 nm-2000 nm (nanometers).

BRIEF DESCRIPTION OF THE DRAWINGS

Referring now to the drawings in which like reference numbers represent corresponding parts throughout FIG. 1. Comparison between poly(SA) film and SW film. (a) Differential scanning calorimetry results showing a shift of melting temperature of SW film to lower degree. (b) Parallel transmittance spectrum for both poly(SA) and SW films, wherein parallel transmittance is defined as the light intensity measured in a similar direction as the incident light but on the other side of the film, divided by the incident light intensity. (c) Diffusive transmittance spectrum for both films, where diffusive transmittance is defined as the light intensity measured deflected by certain angles from the incident light but on the other side of the film, divided by the incident light intensity. Dotted lines show transmittance of both films at transparent status. Solid lines represent transmittance of both films at opaque status. The blue shaded areas represent visible light range from 400 nm to 800 nm. (d) Contact angles of both poly(SA) film and poly(ETPTA) film. (e) SEM images of poly(SA) film (i) and SW film (ii) The film surface in image ii was tilted at 45° to give a better view of the patterns. All scale bars represent 10 μm. (f) Refractive indices of neat poly(ETPTA) film, neat poly(SA) film and SW film as a function of temperature; (g) an X-ray diffraction (XRD) measurement showing similar crystallite sizes in neat poly(SA) film and SW film.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Example Structure and Operation

Disclosed herein is a smart window (SW) material based on a phase changing polymer that can be reversibly switched between a semi-crystalline (opaque) state and an amorphous (transparent) state. The SW film includes a network of the phase changing poly(stearyl acrylate) crosslinked with a poly(ethylene oxide) oligomer. The two constituent polymers display highly distinctive hydrophilia. The transmittance switching of the SW film results from the combination of three different mechanisms: reversible phase changing of the poly(stearyl acrylate) component, phase separation between the two distinct constituent polymers, and a large change of refractive index of the phase-changing polymer during the amorphous-to-semicrystalline transition. The phase separation generates μm-sized surface patterns which increase the overall opacity of the SW film in the opaque state. Furthermore, the semicrystalline poly(stearyl acrylate) phase has a higher refractive index than the amorphous poly(ethylene oxide) phases and thus renders significant light scattering. At elevated temperatures, however, the two constituent polymers have comparable refractive index, leading to high transmittance of the SW film. The opaqueness switching can be reversed and repeated for more than 500 cycles of heating and cooling. A silver nanowire (AgNW) based transparent heater was combined with the SW film to control the semicrystalline-to-amorphous phase transition. The resulting smart window exhibits a significantly high luminous transmittance modulation ($\Delta T_{solar}$ $\Delta T_{solar}$) of of 80.4% and solar transmittance modulation of 70.2%, which significantly outperform existing thermochromic smart windows.

1. Example Fabrication of the Smart Window Film

Figure 1:
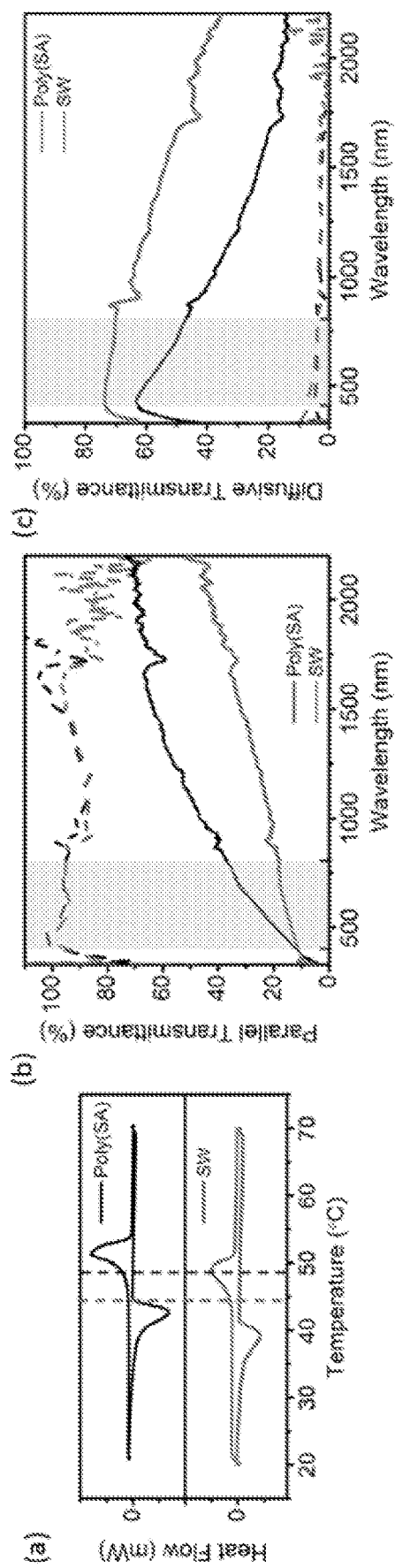
Figure 1:
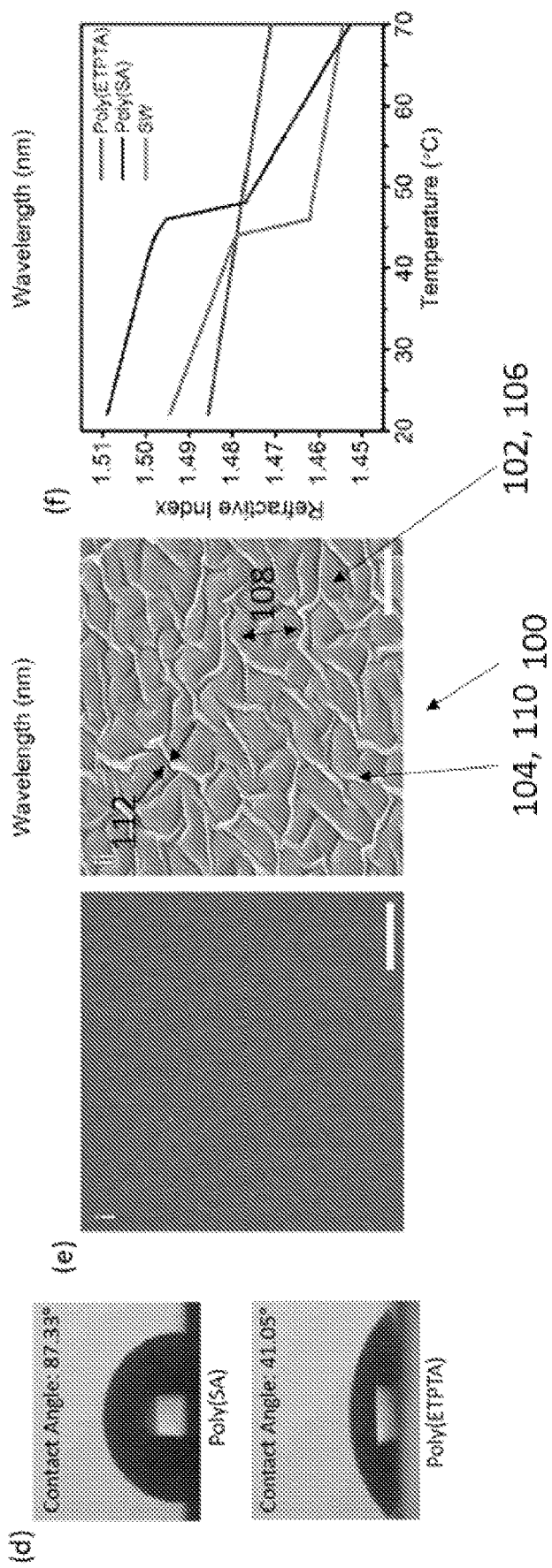
Figure 1G:
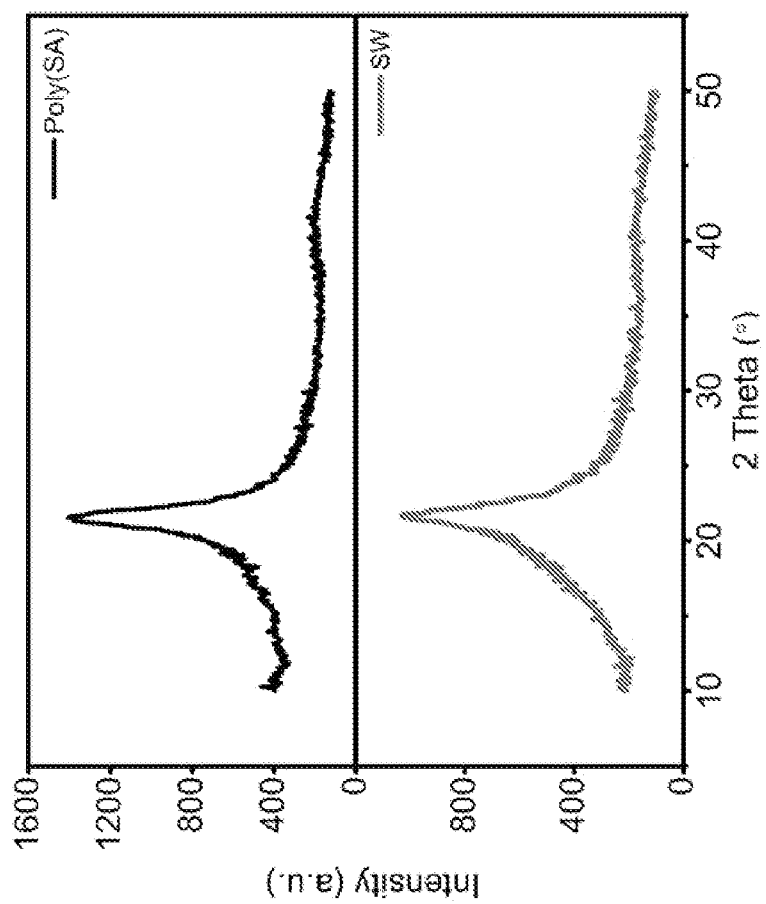

The SW film is prepared from a mixture of two acrylate compounds. For the phase changing component, stearyl acrylate (SA) is selected due to its sharp and reversible crystalline-to-amorphous transition. Cured poly(stearyl acrylate) film has a melting temperature around 49.3° C.° C. as determined by differential scanning calorimetry results (see FIG. 1a). This temperature is sufficiently high for the polymer film to stay stable in the semicrystalline (opaque) state under an ambient environment, and a modest temperature increase can transform it into an amorphous (transparent) state. However, the neat poly(SA) film has a smooth surface and its opacity in its semicrystalline state is modest. For example, the parallel transmittance of a 170 µm thick neat poly(SA) film in the semicrystalline state ranges from 11% to 36.8% in the visible range, and rises rapidly at longer wavelengths (see FIG. 1b and further description below). The wide-angle X-ray diffractogram (XRD) of the neat poly(SA) film is shown in FIG. 1(g), and the full width at half max (FWHM) is used to determine the crystal size of the poly(SA) aggregate based on the Schererr equation:

$$D = \frac{0.94 \times \lambda}{\beta \times \cos\theta} \, D = \frac{0.94 \times \lambda}{\beta \times \cos\theta}$$

where D is the average crystal size, $\beta$ is line broadening in radius, $\theta$ is Bragg angle and $\lambda$ is X-ray wavelength. The poly(SA) crystal size is calculated to be between 3.53-4.36 nm, which is much smaller than visible light wavelength. Rayleigh scattering is thus expected to be the dominating factor for the diminished light transmission. The parallel transmittance of the poly(SA) shown in FIG. 1b is low in the deep blue region and increases with wavelength into the red and infrared regions, as the Rayleigh scattering is proportional to $\lambda^{-4}$. Correspondingly, the diffusive transmittance decreases with wavelength (FIG. 1c).

To increase the opacity of the poly(SA) film over a broad bandwidth, Mie scattering needs to be introduced: the scattering of light by particles larger than the optical wavelength is relatively wavelength independent. Thus, a second acrylate was introduced in the poly(SA) system. A tri-functional acrylate, ethoxylated trimethylolpropane triacrylate (ETPTA), is selected, as the presence of three acrylate groups of ETPTA produces chemical crosslinking on the resulting copolymer and thus enhances the toughness of the resulting film. Note that the neat poly(SA) film is rather brittle. The polyethylene oxide) segments on ETPTA provides water wettability; while the long alkyl chains on SA is hydrophobic. According to the contact angles shown in Figure id, cured ETPTA ($\theta \approx 41.05°$) and cured SA ($\theta \approx 87.33°$ have a large difference in hydrophilia. When these two components are mixed together, the resultant film generates a rough surface with µm-sized patterns due to phase separation, and these µm-sized patterns can help scatter throughout the solar spectrum.

The opacity of the resulting copolymer film increases with the weight ratio of SA to ETPTA from 1:1 up to 6:1. In composition range, higher concentrations of ETPTA hinder the crystallization of SA moieties, and thus affects the opacity of the film at the opaque state; while at concentrations of SA higher than 6:1, the copolymer films become brittle films, and the Mie scattering diminishes as ETPTA component becomes insignificant in the copolymers. In this work, the ratio of 6:1 was used considering the tradeoff between opacity and mechanical strength. This copolymer film is hereafter referred to as the SW film.

The $T_m$ of the SW film is 45° C.° C., lower than that of the neat poly(SA) film (FIG. 1a). The exothermal heat peak during crystallization and endothermal heat peak during crystallite melting also become wider. This can be explained by the crystallization of SA moieties being interrupted by the ETPTA crosslinkers.[30]

The SA and ETPTA monomers do not dissolve into each other; the as-cured SA-ETPTA mixture films had a coarse surface with large phase separations visible to the naked eyes. In preparation of the SW films, acetone was added as a solvent to co-dissolve the SA-ETPTA mixture and confine the phase separation to the micrometer scale in the resulting cured films. The optimal concentration of acetone used in the solution is around 25%, which affords a clear liquid solution. The clear solution was cast into thin films of 150 µm thickness, and then cured under UV light. Acetone was evaporated during the curing process. The resulting solid state film (SW) has a visibly uniform surface.

Scanning Electron Microscopy (SEM) reveals micrometer-size phase separation patterns for the SW film, as in contrast to the neat poly(SA) film which has a uniform surface under SEM (FIG. 1e). The SEM chamber in which the films were imaged was at ambient temperature; both the neat poly(SA) and the SW films are semicrystalline. The SA crystallites are of nm size and cannot be individually observed under the SEM. The 4-5 µm size features in FIG. 1e-ii are considered to be the semicrystalline poly(SA) domain as this constitutes ~80% of the volume of the SW film, while the thin separation lines are comprised of the amorphous ETPTA moiety. The µm domain size introduces Mie scattering which is the major contributor to the light scattering of the SW film at long wavelengths. Meanwhile, the nanocrystals contributes to Rayleigh scattering both in the SW film and the neat poly(SA) film.

Rayleigh scattering strongly deflects light in the UV and blue region and causes the low parallel transmittance of both the neat poly(SA) and the SW film as shown in FIG. 1b, but the scattering diminishes in the red and infrared regions. The neat poly(SA) film shows fairly high parallel transmittance at the long wavelengths. The µm-sized patterns on the SW film helps lower the parallel transmittance to 34% at 1500 nm, while the diffusive transmittance is ~60% (FIG. 1c). Above the $T_m$, the parallel transmittances of both the neat poly(SA) and the SW films are close to 100% and the diffusive transmittances are nearly 0%, like transparent glass.

The refractive indices of the neat poly(SA) and the neat poly(ETPTA) films were measured with increasing temperature using a refractometer. FIG. 1f shows that the refractive index of the neat poly(SA) film initially decreases gradually with temperature, but exhibits a precipitous drop around the $T_m$, from 1.498 at 44° C. to 1.477 at 48° C.), as the nanocrystalline SA moiety turns amorphous. The refractive index of ETPTA film shows a featureless decline from 1.486 (at R.T.) to 1.478 (at 48° C.). As a result, the copolymer of SA and ETPTA in the SW film at ambient temperature has a large index mismatch between the ETPTA domain and the SA domain, leading to high opacity for the SW film. At elevated temperatures, particularly between 45-50° C., the refractive indices match quite well (less than 0.1% difference), the SW film appears transparent despite urn-scale phase separation. FIG. 1f also shows that the refractive index of the neat poly(SA) at the molten state decreases with rising temperature much faster than that of the neat poly(ETPTA). This probably can be explained by the greater mobility of the stearyl chains (with a free end) than the chains in poly (ETPTA) (that are crosslinked on both ends). In the SW film, due to the crosslinking and the finite size of the SA domain, it is likely that the refractive index of the confined SA domain does not decrease with temperature above $T_m$ as rapidly as the neat poly(SA) does. This can be conferred from the measured refractive index of the SW film above $T_m$ where the decrease of the refractive index follows a similar pace as that of poly(ETPTA).

Figure 3:
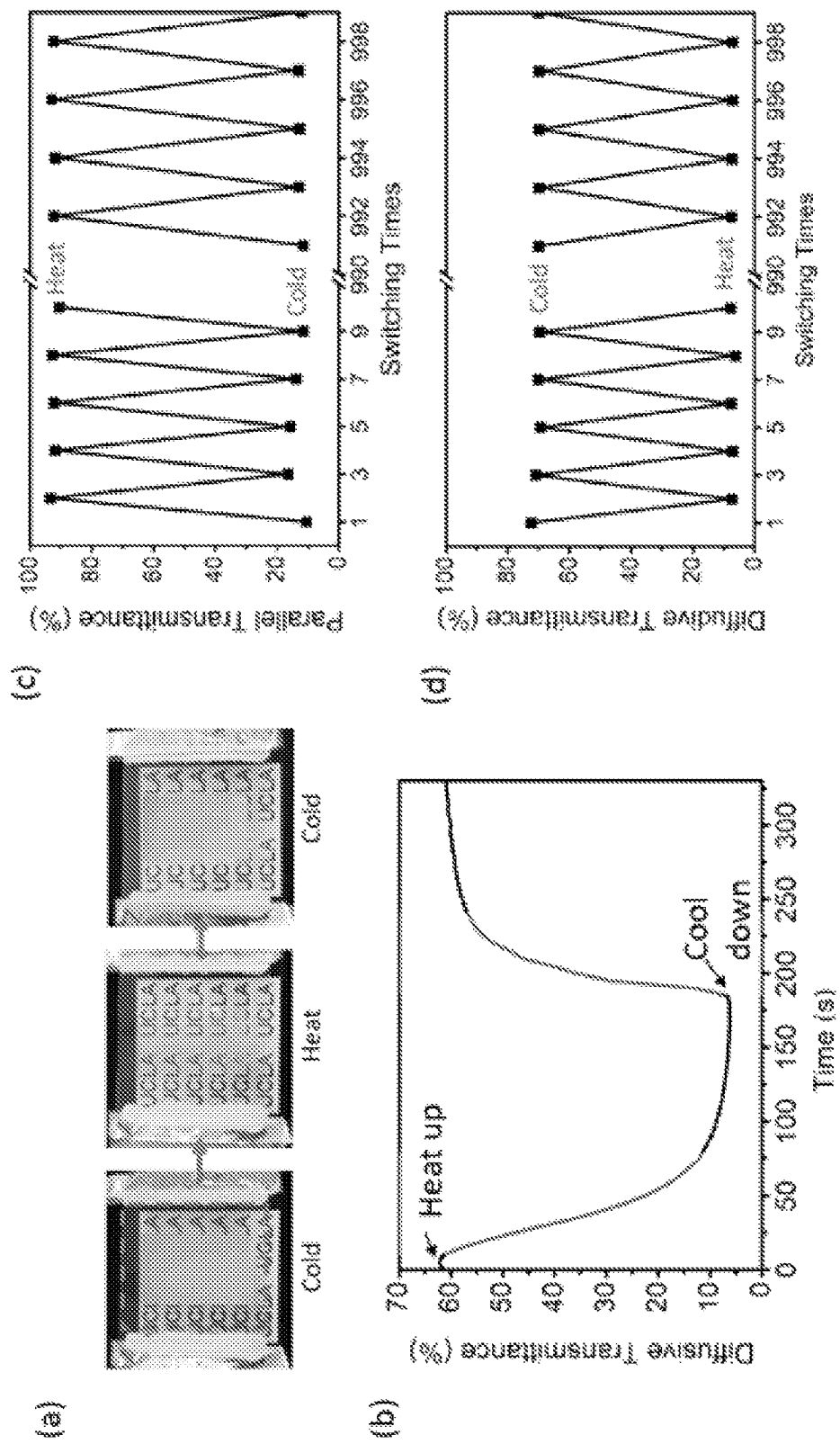
FIG. 3. Demonstration of all-solid smart windows. (a) One switching cycle of a flat smart window. Underneath "UCLA" patterns can show up or hide upon the switching on/off of this smart window. The red dotted square frame indicates the location of AgNW/PUA composite heater. (b) Switching speed of smart windows. (c) and (d) are parallel and diffusive transmittance spectra of cyclic switching of a flat smart window for over 500 cycles. (e) and (f) are opaque and transparent statuses of a flat smart window that was mounted on a real glass window. (g) One switching cycle of a curved smart window that is mounted on a round vial; and (h)-(j) optical microscopic images of SW films during one switching cycle showing Initial opaque state (h) showing a rough surface patterns induced by phase separation. After being heated up, the transparent film (i) demonstrates a smoother surface. After being cooled down again, the surface patterns (j) are restored.
Figure 3:
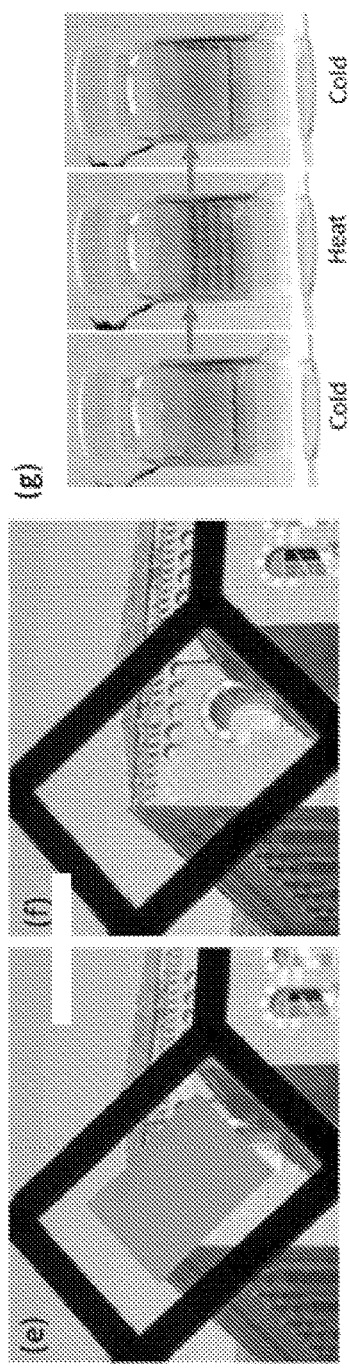
Figure 3:
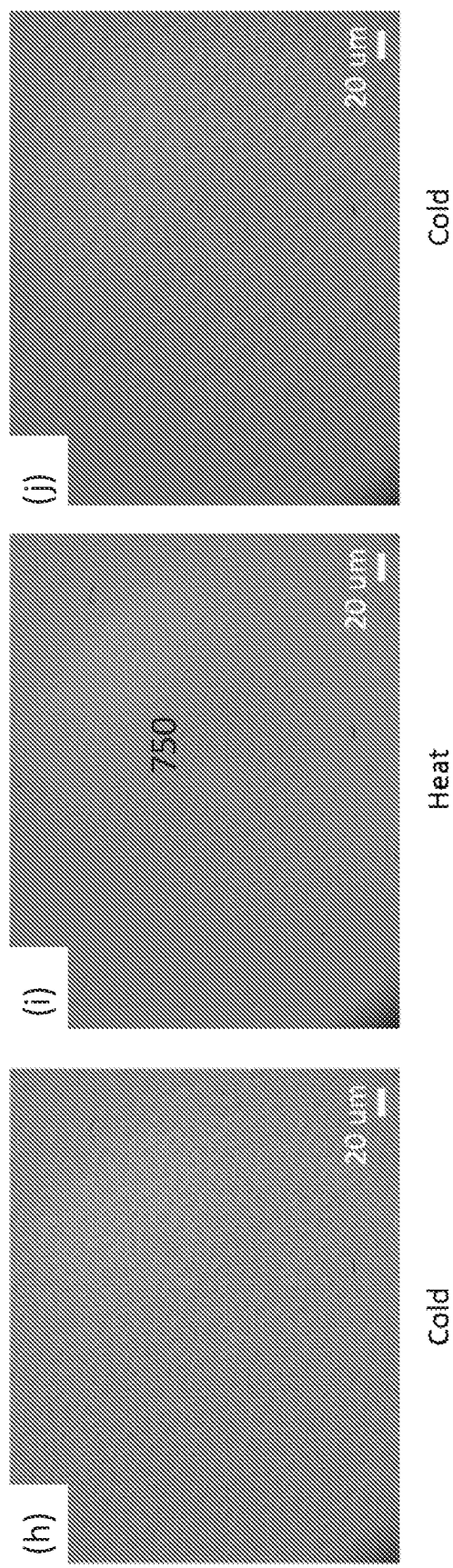

The in-situ transition from opaque to transparent states and the recovery of the SW films were imaged under an optical microscope. FIG. 3(h) shows the surface morphology of the SW film at the cold state where the μm-sized patterns can be clearly observed. When heated up, the surface patterns became much flattened (FIG. 3(i)), which is consistent with the high transparency of the film at the heated state. In the SW films, the SA and ETPTA chains are crosslinked, which prevents significant re-structuring of phase separation as long range motion of the two components is prohibited. The surface pattern change is thus reversible after cools the SW film down to room temperature (FIG. 3(j)).

2. Example Light Modulation Performance of the Smart Window Film

As discussed in the previous section, three mechanisms collectively contribute to the switchable opacity in the SW films: the reversible semicrystalline-to-amorphous transition of the SA moiety where the crystalline state is opaque due to Rayleigh scattering while the amorphous state is transparent; the μm-scale phase separation between the SA and ETPTA domains leading to Mie scattering; and the matching refractive index of the SA and ETPTA domains at the transparent state which leads to high transparency above the $T_m$, while below $T_m$ the indices are mismatched (enhancing the Mie scattering effect).

Figure 2A:
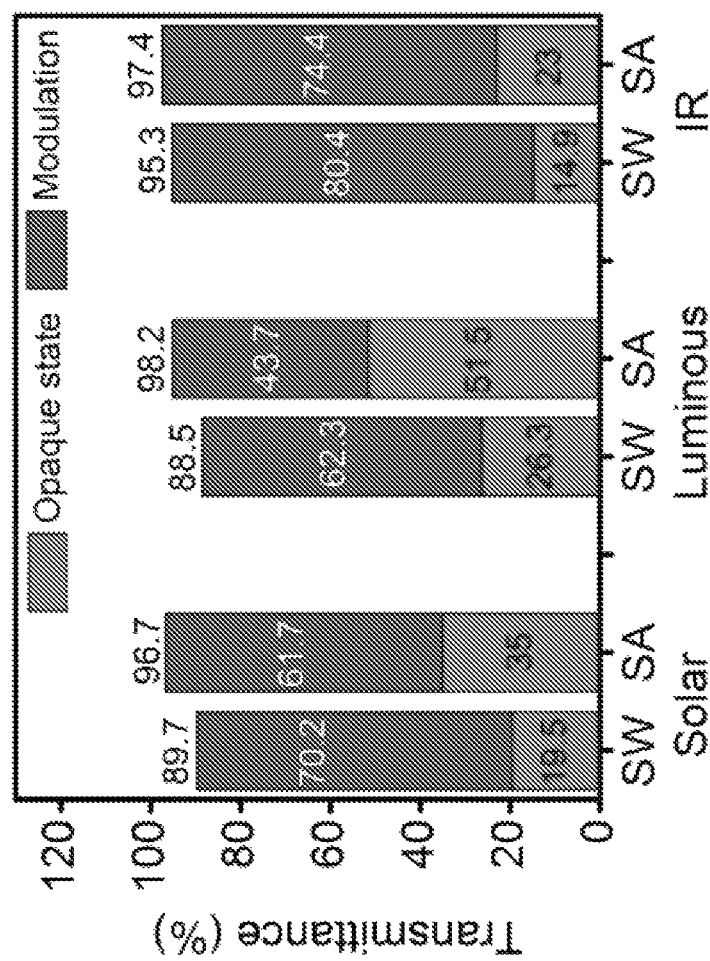
FIG. 2a. Poly(SA) film and SW film light modulation capabilities. Solar, luminous and IR transmittance comparison between SW and neat poly(SA) films.
Figure 2B:
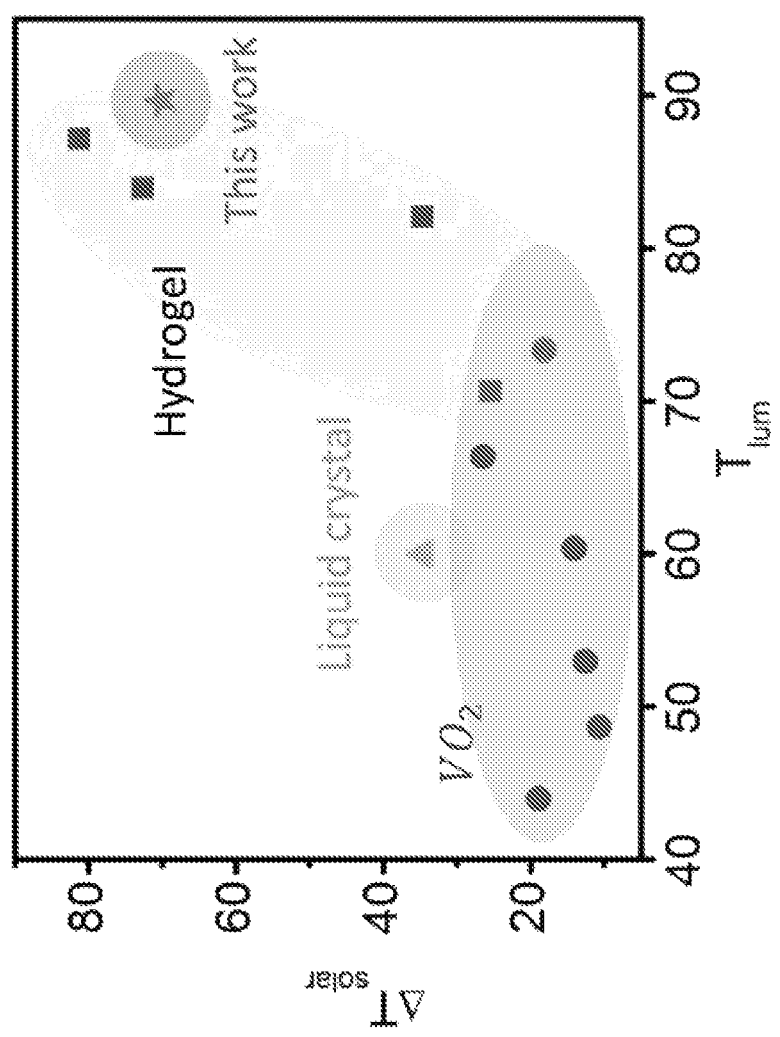
FIG. 2b. Transmittance modulation performance comparison. This work is compared with the best reported thermochromic smart windows: hydrogel films, VO$_2$ based films, liquid crystals hybrid films.[3,14,18,31-38]

The capability of light modulation of the SW film is characterized by the integral transmittance in the solar, visible (or luminous), and infrared wavelength ranges, $T_{solar}$, $T_{lum}$, and $T_{IR}$, respectively, with the following equation:[3]

$$T_{solar}, T_{lum}, T_{IR} = \frac{\int \varphi(\lambda)T(\lambda)d\lambda}{\int \varphi(\lambda)d\lambda}, T_{solar}, T_{lum}, T_{IR} = \frac{\int \varphi(\lambda)T(\lambda)d\lambda}{\int \varphi(\lambda)d\lambda},$$

where $T(\lambda)$ is the measured transmittance at specific wavelength $\lambda$. For $T_{solar}$ and $T_{IR}$, $\psi(\lambda)$ is the solar irradiance spectrum for air mass 1.5; and for $T_{lum}$, $\psi(\lambda)$ is the CIE "physiologically-relevant" luminous efficiency function. The wavelength ranges are 300-2500 nm for the solar, 390-780 nm for the luminous, and 780-2500 nm for the infrared (IR) ranges. The transmittance modulation, $\Delta T_{solar}$, $\Delta T_{lum}$, and $\Delta T_{IR}$, is calculated by subtracting the transmittance in the transparent state by the transmittance in the opaque state. The calculated transmittance and transmittance modulation results are shown in FIG. 2a where transmittances of cold (opaque) state are shown as red columns, and the transmittance modulations are the blue columns. The transmittances of the transparent state are represented by the total height of red and blue columns. The SW film shows much better performance over the neat poly(SA) film with regard to both the opacity at opaque state (lower $T_{solar}$, $T_{lum}$, and $T_{IR}$) and transmittance modulation (higher $\Delta T_{solar}$, $\Delta T_{lum}$, and $\Delta T_{IR}$). The transparency of the SW film in the transparent state is slightly lower than the neat poly(SA), thanks to the phase separation. The neat poly(SA film) has a high Tilt of 51.46% in the opaque state, which results in a limited $\Delta T_{solar}$ of 61.7%. With the introduction of Mie scattering by the phase separation from the two polymer components, the $T_{IR}$ of the SW film drops to 26.26% in the opaque state and contributes to a high $\Delta T_{solar}$ of 70.2%. The large $\Delta T_{solar}$ of the SW film makes it an attractive material to limit the solar heating in the summer. FIG. 2b shows the SW film according to embodiments described herein has significantly improved light modulation properties as compared to thermochromic smart windows comprising $VO_2$ based films and liquified crystals, and has at least comparable performance to a thermochromic smart window comprising a hydrogel film.

In the winter time, a major heat loss from buildings and residences is via IR irradiation. In this regard, the $\Delta T_{IR}$ of the SW film is 80.4%, which is also higher than the 74.4% value for the poly(SA) film.

For privacy protection purposes, the key metric is the SW film's $\Delta T_{lum}$. From the opaque state to transparent state, the $T_{lum}$ increases from 26.3% to 88.5%, which creates an 62.3% visible light modulation. The high opacity of the SW film at opaque state rivals with highly textured glasses with high privacy level (level 7-10, 0%-30% transmittance) for privacy protection purpose. Unlike the textured glasses, the SW film can be switched to a highly transparent state on demand.

3. Example Smart Window Demonstration

A transparent Joule heater is required to provide the necessary heating to control the opaqueness of the SW film for practical smart window applications. In this work, AgNW was selected as the basis of the heating element. The fabrication and characterization of the AgNW heater is illustrated in and described in the Materials and Method section. The final AgNW composite heater consists of a percolation network of AgNWs that is embedded in a polyurethane acrylate (PUA) matrix. The selected PUA matrix imparts high transparency, toughness, and non-yellowing properties.

Figure 7:
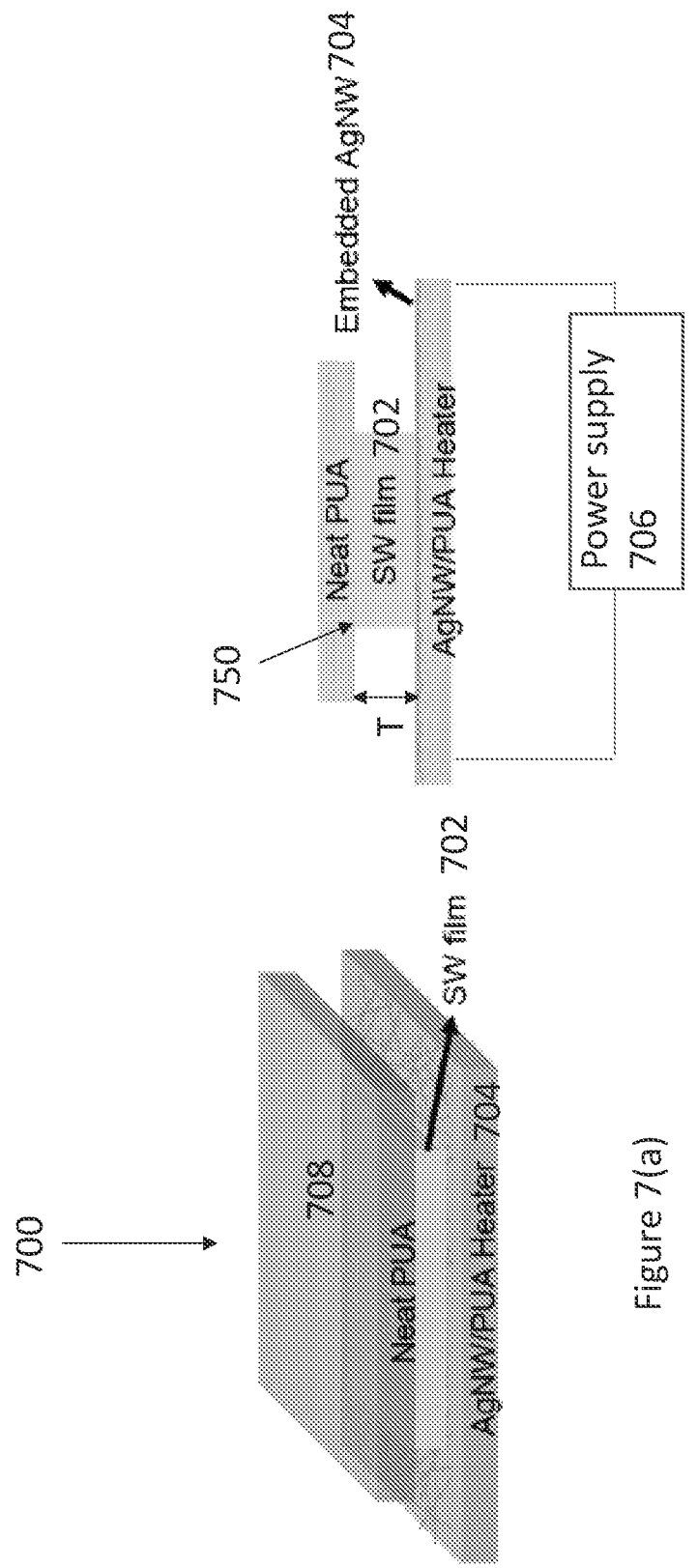
FIG. 7(a)-(b). Schematic illustration of the device structure for a smart window design. (a) is perspective view, (b) is cross-section view.

A smart window was fabricated by sandwiching a SW film in between a transparent AgNWs composite heater and a transparent PUA film, followed by a hot pressing process to seal the device. The structure of this smart window can be seen in FIG. 7. Both top PUA transparent film and bottom PUA/AgNW electrode have a thickness around 70 μm. A photograph of the smart window device is shown in FIG. 3a where the red dotted frame indicates the active area of AgNW composite heater. The initial state of the film is opaque, and the "UCLA" patterns cannot be seen through the SW film. When an appropriate voltage is applied onto the AgNW electrode, the SW film becomes transparent and the text "UCLA" becomes visible. After cooling to room temperature again, the SW film returns to its opaque state and blocks "UCLA." patterns underneath. The kinetics of the heating and rate of the opacity change is determined by the heating voltage. Higher voltages leads to faster switching.

FIG. 3b shows the dynamics of the heating process. The active area being switched is 1.5 cm×2.5 cm. 90% of the light modulation is done in 60 s for both the heating and cooling processes. The demonstrate the repeatability of the opacity switching, the SW device underwent 500 cycles of heating and cooling. FIG. 3c, 3d shows the parallel and diffusive transmittances for the first 5 and last 5 switching cycles. For the last 5 switching cycles, the transmittance remains consistent in both opaque and transparent states of the smart window. For a typical switching cycle, the parallel transmittance of the smart window changed from 92% to 13% (at 550 nm) and the averaged transmittance modulation contrast is about 79%.

A larger SW film (5 cm×7 cm) was attached to a real window to show its feasibility for practical applications (FIG. 3e, f). By heating up and cooling down the SW film, the building in the background can be completely blocked or clearly seen.

Since all the components for the smart window are flexible, the SW device was also attached to a curved surface to test the performance for windows having a curved shape. The SW device was fixed to the outer surface of a vial with radius of 1 cm (see FIG. 3g). A piece of paper printed with "UCLA" patterns was attached to the other side of the vial prior to wrapping with the SW film. The SW device can be switched between opaque and transparent states repeatedly.

A new smart window material has been synthesized incorporating three synergistic mechanisms for wide-bandwidth optical modulation. The SA and ETPTA moieties in the SW film produce (1) μm-scale phase separation, (2) reversible crystalline-to-amorphous transition of the SA moiety, and (3) refractive index matching between the phase separated domains at the molten state and large mismatch at the crystalline state. These effects collectively generate high opacity over the whole solar spectrum at the ambient temperature when the SA moiety is crystalline, and high transparency above 46° C. when the SA domain melts. The measured $\Delta T_{lum}$, $\Delta T_{lum}$, $\Delta T_{solar}$ $\Delta T_{solar}$, and $\Delta T_{IR}\Delta T_{IR}$ are 62.3%. 70.2%, and 80.4% respectively. The SW film was laminated with a transparent AgNW/PUA composite electrode to provide uniformly distributed heating to administer the opacity switching. The resulting SW device is solid state, thin, and flexible. The opacity switching can be repeated for more than 500 cycles without significant reduction of the ΔT.

Example Materials

Materials. Stearyl acrylate (SA), 2,2-Dimethoxy-2-phentlacetophenone (DMPA) and trimethylolpropane trimethacrylate (TMPTA) were purchased from Sigma-Aldrich. Ethoxylated trimethylolpropane triacrylate (ETPTA), polyurethane acrylate (CN9009), difunctional acrylic monomer (SR306) were supplied by Sartomer. AgNWs with an average diameter of 25-35 nm, length of 15-25 urn were provided by Kechuang.

Fabrication of Smart Window (SW) films. Stearyl acrylate and ETPTA were mixed at weight ratio 1:1 to 6:1, then 1 wt % of DMPA was added in as photo-initiator. The whole mixture was admixed with 25-30 wt % acetone to render a clear solution, followed by thorough sonication. The clear solution was injected between two glass slides separated by spacers (170 μm), and then cured under UV light for 3 mins. After curing, the film was peeled off as a freestanding SW film with thickness around 150 μm.

Fabrication of AgNW/PUA composite heaters. PUA polymer precursor was prepared by mixing CN9009 and SR306 at a ratio of 5:1, 1 wt % of DMPA was then added. Ultrasonication was applied to get a uniform mixture. The transparent and flexible heater was fabricated in two steps. Firstly, a dispersion of AgNWs in isopropanol (~2 mg/ml concentration) was coated on a pre-cleaned glass slide with Meyer bar (RD Specialist). Secondly, another pre-cleaned glass slide was applied on top of the conductive coating with spacers. The thickness of the spacers can be chosen from 50 μm to 170 μm, which consequently decide the thickness of the resultant AgNW/PUA composite heater. PUA polymer precursor was then injected in between the two glass slides, followed by UV curing for 3 minutes. Then the AgNW/PUA film was peeled off as a free-standing composite heater.

Fabrication of Smart Window Devices. The smart window devices consist of three laminated layers: top PUA film with thickness of 70 μm, middle SW film with thickness of 150 μm and bottom. AgNW/PUA composite heater with 70 μm in thickness. The top PUA film was fabricated using the same process as the fabrication of AgNW/PUA composite heaters without the AgNWs coating step. The top PUA layer was designed to be smaller than the bottom AgNW/PUA layer by 1 cm in only one dimension to allow the exposure of the conductive embedded AgNWs. The stacked structure was then laminated by a hot pressed for several times with temperature below 40° C. to ensure a good sealing. Aluminum foil stripes were fixed to both sides of the exposed AgNWs. Silver paste were applied between aluminum foil and AgNW/PUA film to augment electrical contact.

Characterization. Transmittance spectrum was taken using a Shimadzu UC-3101PC UV-Vis-NIR spectrophotometer with tungsten halogen and deuterium lamps. SEM images were taken by a MI Nova Nano 230 scanning electron microscope. Optical microscope images were obtained from a Zeiss microscope. Cyclic bending tests were performed on a motorized linear stage with built-in controller (Zaber Technologies Inc.). Mechanical properties were tested on a TA Instruments RSAIII dynamic mechanical analyzer (DMA). Samples were made to 3 mm in widths and 70 μm in thicknesses. The separation between thin film grips of DMA was set to 5 mm. Dynamic temperature sweep tests were operated at a 2° C. $\min^{-1}$ ramp rate and 1 Hz frequency. Transition temperature of SW film was measured with a PerkinElmer differential scanning calorimeter (DSC 8000) at a ramping rate of 15° C. $\min^{-1}$. The heating performance of the AgNW/PUA heater was tested with a DC power voltage supplier (Agilent E3612A). The temperature of the AgNW/PUA heater was measured by an infrared camera (ICI 9320P). Contact angles of films were detected with an APPR telescope-goniometer. And refractive indices of films were measured by a Metricon refractometer (2010/M). Film X-ray diffraction data was obtained using a Panalytical X'Pert Pro X-ray diffractometer with Cu Ku radiation.

Example Heater Fabrication Process

Figure 4:
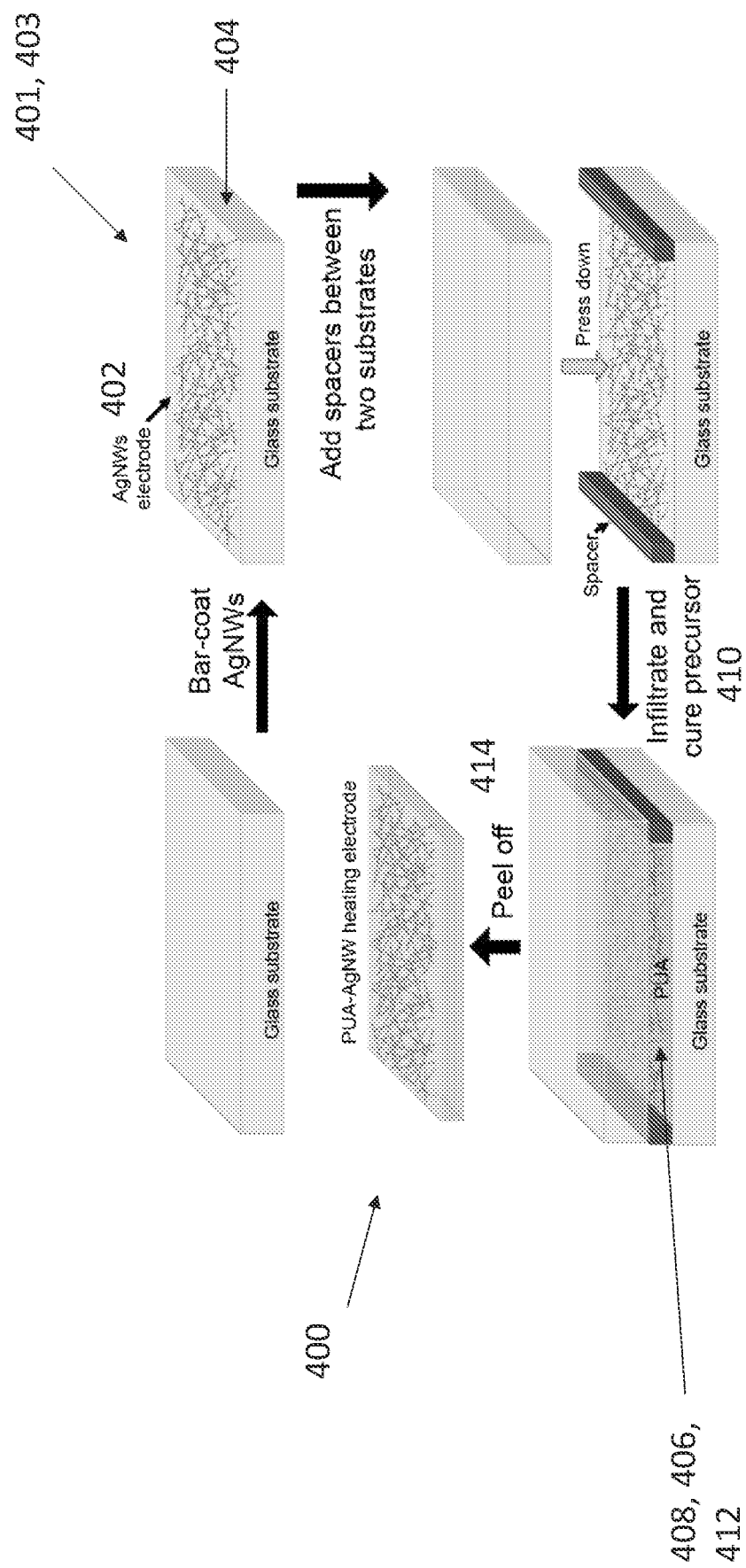
FIG. 4. A schematic illustration for the fabrication process of AgNW/PUA composite heater.

The fabrication process of an example nanowire composite heater is illustrated in FIG. 4. The final nanowire composite heater 400 comprises a percolation network 403 of nanowires 402 e.g., silver nanowires (AgNWs) that are embedded in a polyurethane acrylate (PUA) matrix. More generally, FIG. 4 illustrates a method of fabricating the transparent conductive layer comprising depositing 401 a conductive material coating (e.g., comprising nanowires 402 or electrodes, e.g., comprising nanowires) on a release substrate 404 (e.g., a glass substrate); (b) applying 406 a polymer precursor layer 408 over the conductive material coating; curing 410 the polymer precursor layer to form a solid polymer film 412 (e.g., PUA); and separating (e.g., peeling 414) the cured solid polymer film from the release substrate, so that the transparent conductive layer comprises an embedded conductive layer comprising the electrodes or nanowires embedded in the solid polymer film. Additional optional spacers and pressing steps between an additional substrate is also shown.

Characterization of Example Heaters

Figure 5:
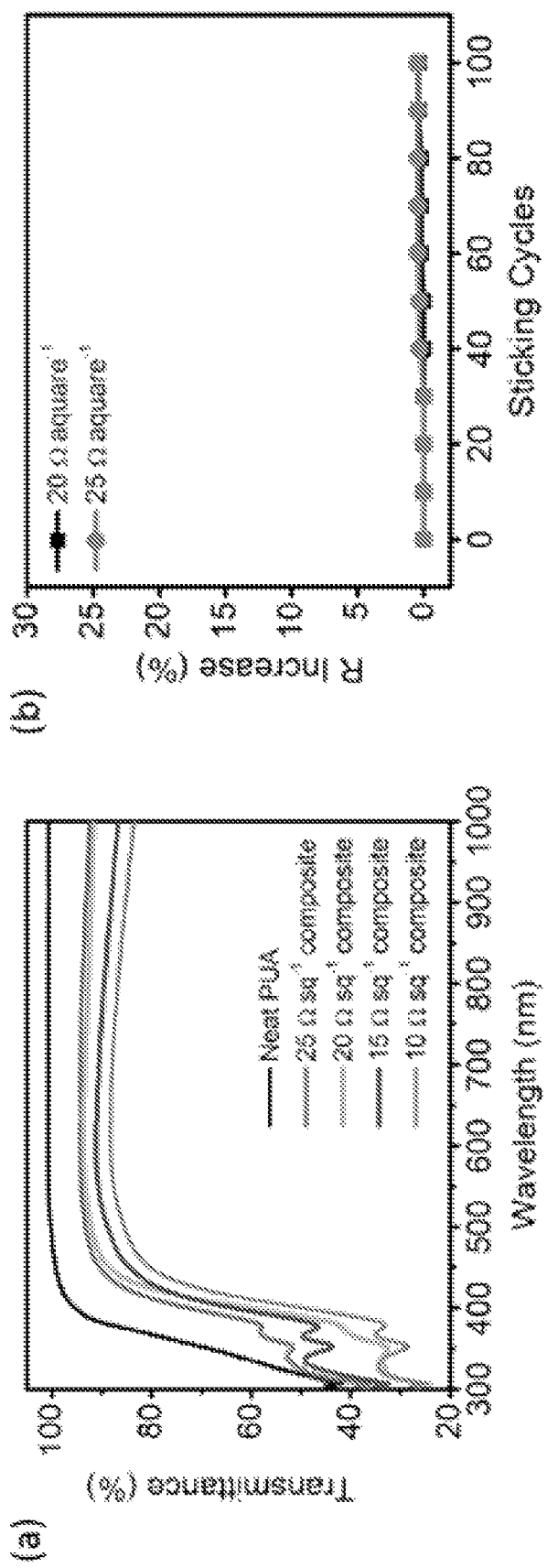
FIG. 5. Performances of AgNW/PUA composite heaters. (a) Parallel Transmittance spectrum of AgNW/PUA composite heaters with different sheet resistance. (b) Resistance change with sticking cycles. (c) Resistance change with bending-unbending experiments. (d) Setup for bending-unbending experiments.
Figure 5:
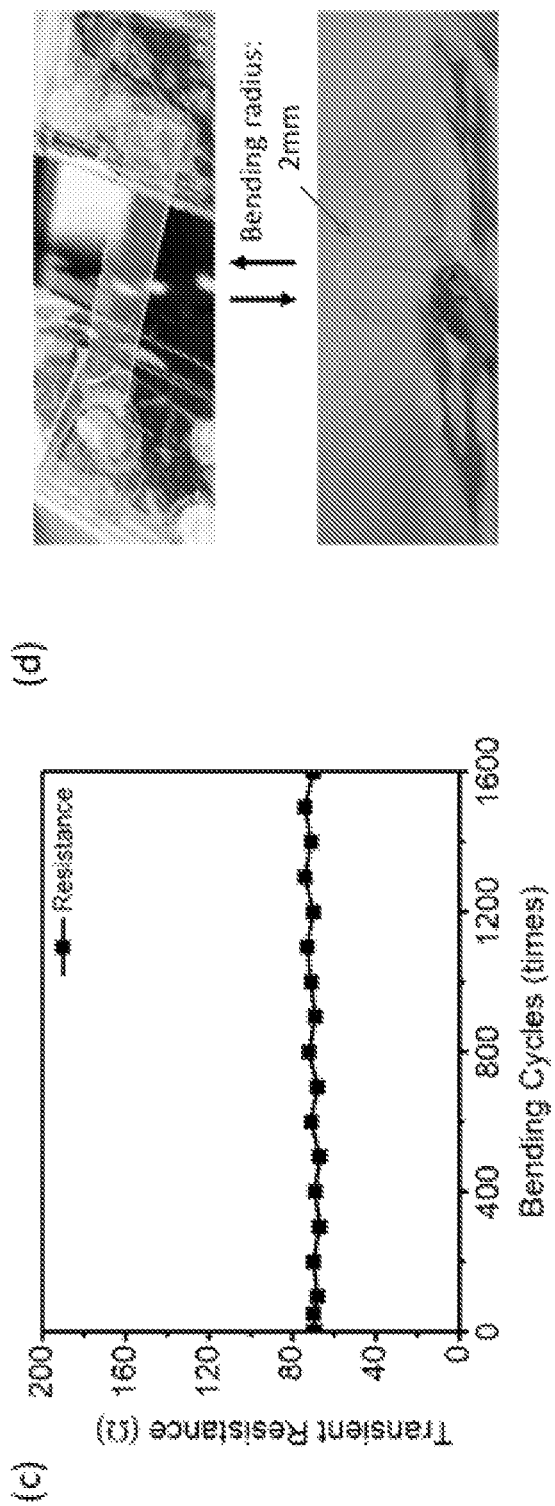

The transmittance spectrum of the neat PUA films in FIG. 5a shows a 100% transmittance at 550 nm. With embedded AgNW networks of different conductivities, the transmittances at 550 nm for 10 Ω/sq, 15 Ω/sq, 20 Ω/sq, 25 Ω/sq composite heaters are 87.6%, 90.8%, 93.4% and 94.2% respectively. These values compare favorably with commercial ITO-glass and ITO-polyethylene terephthalate (PET) films with typical transmittance of 84% @ 10 Ω/sq and 80% @ 30 Ω/sq, respectively. AgNWs composite heaters with sheet resistance of 20 Ω/sq or 25 Ω/sq were selected to retain high transparency for the smart window films. Scotch magic tape was adhered to the conductive side of the composite heater and then peeled off to examine the bonding of the AgNWs on the PUS surface. After 100 cycles of this peeling experiments, the transient resistances (FIG. 5l)) didn't change for both heaters with resistance of 20 Ω/sq and 25 Ω/sq, indicating little removal of AgNWs during the peeling. Mechanical flexibility of the composite heater was also evaluated through a bending experiment (FIG. 5c). The heater was attached to a custom-designed linear stage and repeatedly bent to a radius of 2 mm (FIG. 5d). The resistance of this AgNWs composite heater remained stable after 1600 bending-unbending cycles with a moving speed of 50 mm/s.

Figure 6:
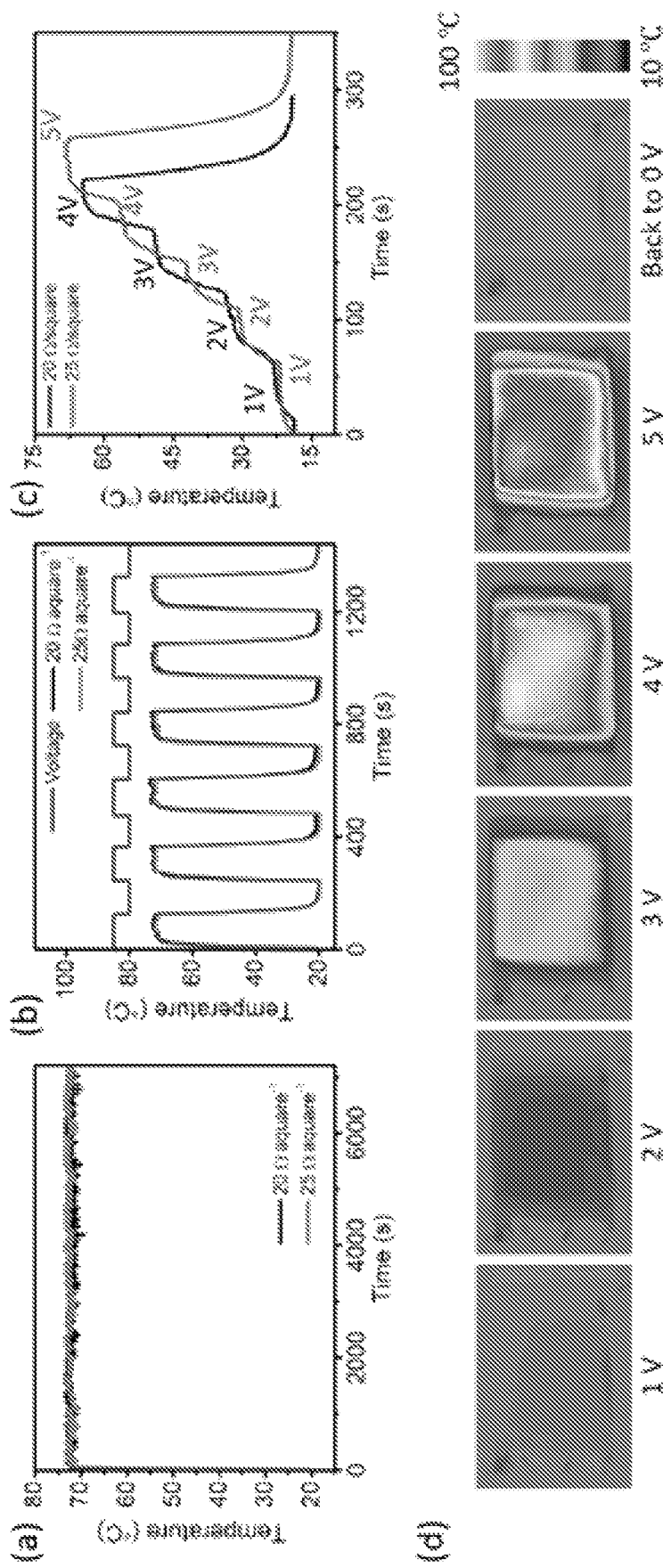
FIG. 6. Heating performance of AgNW/PUA composite heaters. (a) Long term joule heating properties. (b) Cyclic joule heating tests with applied square wave voltages. (c) Time-dependent temperature change with increased external voltages. (d) ER images at different applied voltages showing temperature distributions of AgNW/PUA composite heaters. (e) Saturation temperatures at various power densities. The power efficiency is indicated by the slope. (f) Heater saturation temperature as a function of external voltage.
Figure 6:
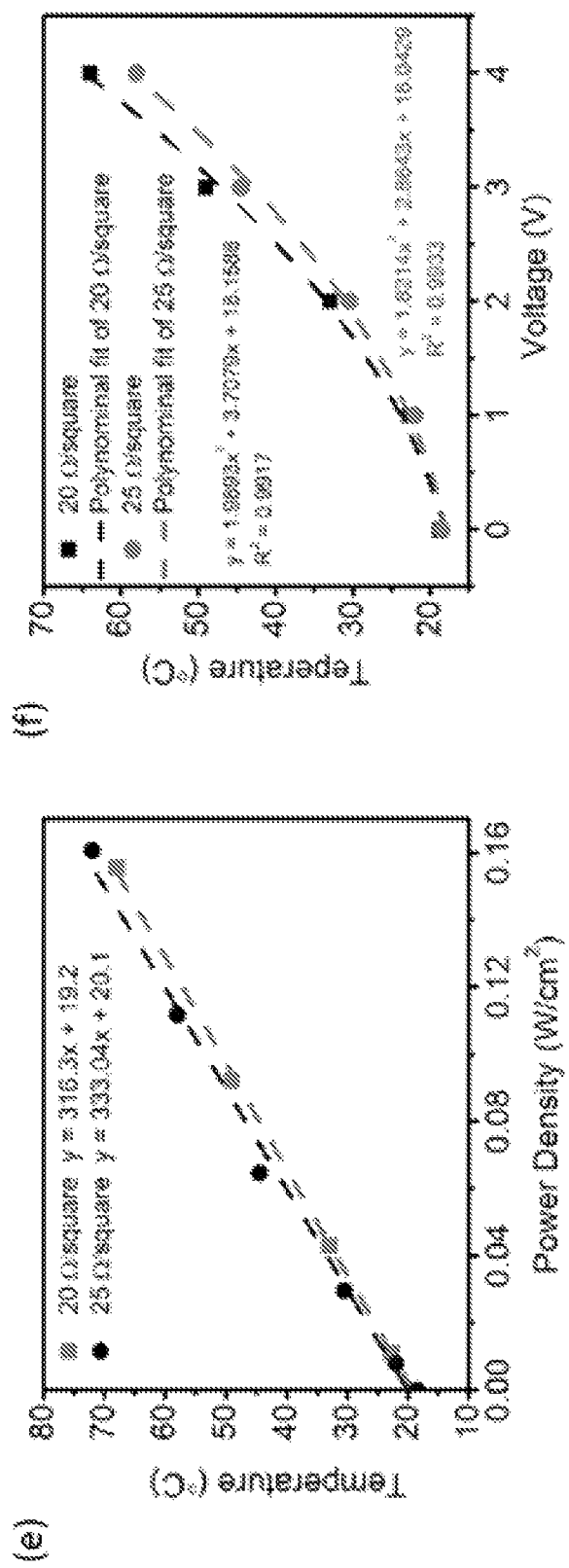

To gauge the heating performance of the AgNWs composite heater, aluminum and silver paste was applied to two sides of the heater film as the side contacts, leaving an active heating area of 2.37 cm×2.43 cm. When DC voltages (4-5 V) are applied, the heaters can be ramped up to and maintained at 70° C. for more than 2 hours without adjusting the external voltage as shown in FIG. 6a. The constant temperature output reflects the stable resistance of the AgNWs, thanks to the protection of PUA matrix. As shown in FIG. 6b, specified square wave voltages were applied to AgNWs composite heaters with different resistances, both heaters were heated to 70° C., and then cooled to room temperature for 6 cycles. The temperatures of the films showed no deviation between each cycle, indicating good repeatability. Different DC voltages were also applied to the composite heater, and the saturation temperatures were measured with an infrared (IR) camera. FIG. 6c shows the time dependent temperature change of the composite heaters with different resistances. Each level of DC voltage was kept until the temperature of the films reached equilibrium. FIG. 6d displays the IR images of the composite heater with 25 Ω/sq sheet resistance at different DC voltages. A relatively uniform heating property throughout the whole film was observed even at high temperatures. As compared in FIG. 6e, the temperature of the composite heater with a lower sheet resistance increased slightly faster with applied voltage. The fitted curves of the two composite heaters reflect a linear relationship between the temperature and square of the applied DC voltage. As for the power efficiency, the two heaters with different resistances show a similar performance as seen in FIG. 6l. The slope of the saturated temperature-power density curve exhibited a power efficiency of >300° C. cm$^2$/W for both heaters. Since the transition temperature of the working SW film is around 45° C., only 3-4 V DC voltage is needed to switch on the SW film with a required working power density that is less than 0.1 W/cm$^2$. The cyclic heating property of the AgNWs composite heaters were also assessed by repeatedly applying and removing DC voltages.

FIGS. 7(a) and 7(b) illustrate an example smart window 700 comprising a solid polymer film SW, 702 which is opaque at an ambient temperature and transparent at an elevated temperature; a transparent heater 704 to supply uniform heating to at least a part of the solid polymer film; and a power supply 706 electrically connected to the transparent heater to provide electrical power causing the heater to output heat. In some examples, the smart window includes an optional polymer (e.g., PUA) layer 708 on top of the SW so that the SW is between the optional polymer layer 708 and the heater 704.

Example Smart Window Fabrications Steps

Figure 8:
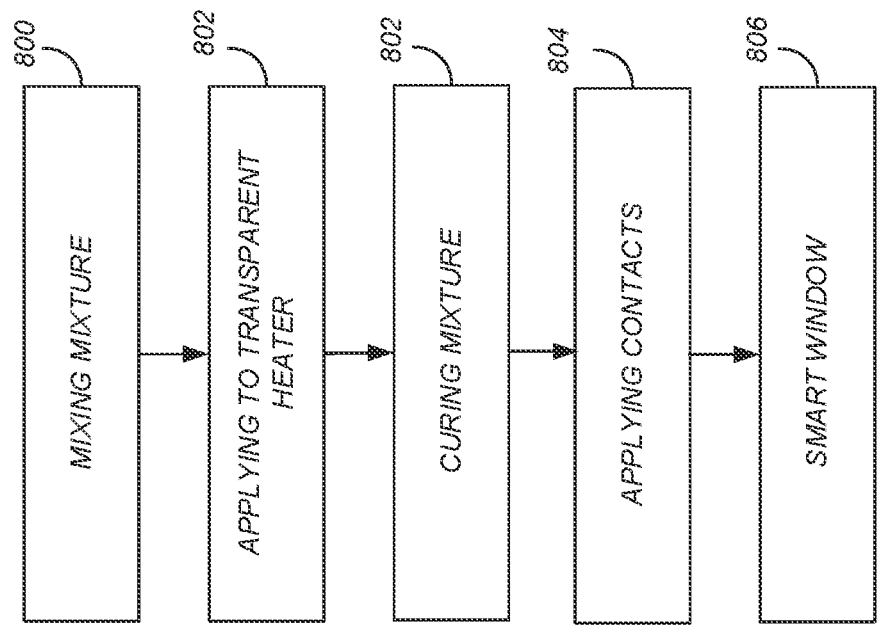
FIG. 8. Flowchart illustrating a method of making a smart window according to a first example.

FIG. 8 is a flowchart illustrating a method to make the smart window according to a first example. The method comprises the following steps.

Block 800 represents homogeneously mixing two different monomers so as to form a mixture.

Block 802 represents applying the mixture on top of the transparent heater.

Block 804 represents curing the mixture by or using ultraviolet UV light or heat so as to form the solid polymer film.

Block 806 represents applying electrical contacts to the transparent heater.

Block 808 represents the end result, a smart window.

Figure 9:
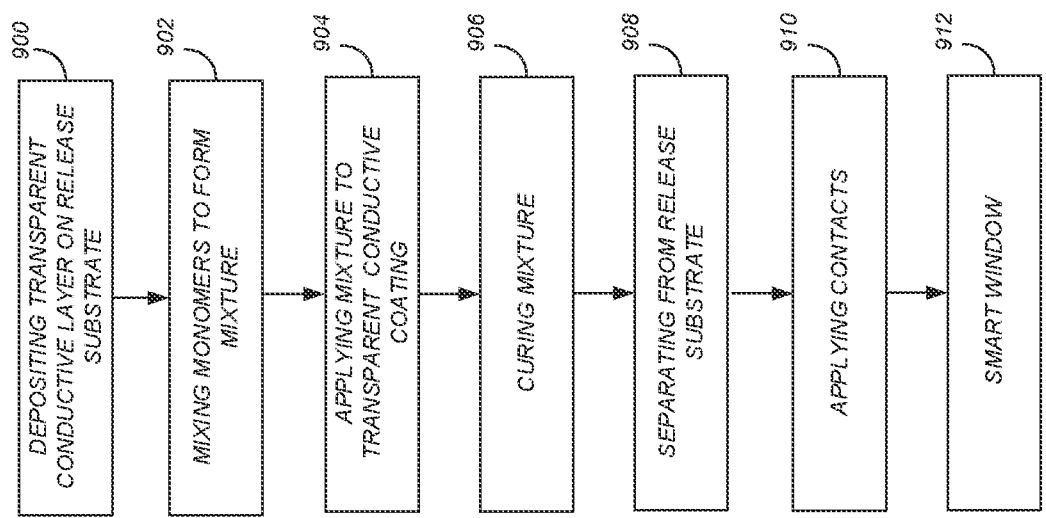
FIG. 9. Flowchart illustrating a method of making a smart window according to a second example.

FIG. 9 is a flowchart illustrating a method to make smart window according to a second example.

Block. 900 represents depositing a transparent conductive material coating (e.g., nanowires) on a release substrate.

Block 902 represents homogeneously mixing two different monomers so as to form a mixture.

Block 904 represents applying the mixture on top of the transparent conductive material coating.

Block 906 represents curing the mixture by or using ultraviolet (UV) light or heat so as to form the solid polymer film comprising a cured polymer film and further including the transparent conductive material (e.g., the transparent conductive material coating embedded in the solid polymer film).

Block 908 represents separating the cured polymer film with the transparent conductive material coating from the release substrate.

Block 910 represents applying electrical contacts to the transparent conductive material coating.

Block 912 represents the end result, a smart window.

Example Device and Composition Embodiments

A device, method, and composition of matter according to the present disclosure can be embodied in many ways including, but not limited to, the following (referring also to FIGS. 1-9).

1. A smart window 700, comprising:
   a solid polymer film 702 which is opaque at an ambient temperature and transparent at an elevated temperature;
   a transparent heater 704 thermally coupled or connected to the solid polymer film to supply uniform heating to at least a part of the solid polymer film; and a power supply 706 connected to the transparent heater.

2. The smart window of example 1, wherein the solid polymer film:
   is opaque at the ambient temperature with a parallel transmittance less than 50%;
   becomes transparent at the elevated temperature with a parallel transmittance greater than 50%, and
   has a transition temperature that is greater than 30° C. and less than 130° C., wherein the transition temperature is the temperature at which the solid polymer film changes from being opaque to being transparent. In some examples of example 2, the parallel transmittance in is $I_{out}/I_{in}$, where $I_{in}$ is the intensity of the incident light incident on the solid polymer film and $I_{out}$ is the intensity of the light transmitted through the film and measured on the other side along one or more direction within 5 degrees of the direction of the incident light $I_{in}$, and the parallel transmittance greater than 50% in the transparent state and less than 50% in the opaque state is measured for all wavelengths of solar radiation or in a range of 500 nm to 2000 nm.

3. The smart window of example 1 or 2, wherein:
the solid polymer film includes a phase changing moiety 102,
the phase changing moiety undergoes a phase change at the elevated temperature,
the phase changing moiety has a refractive index changing by at least 0.01 during the phase change, and
the phase change is reversed when the temperature of the solid polymer film is lowered to the ambient temperature.

4. The smart window of example 3, wherein the phase changing moiety 102 comprises:
at least one first compound selected from the group consisting of or comprising hydrocarbon groups including hexadecyl and octadecyl, and
polymer chain segments selected from the group consisting of or including polyacrylate, polycaprolactone, poly(ethylene-vinyl acetate), polyethylene, poly(cyclooctene), chlorinated polyethylene, chlorosulfonated polyethylene, and their copolymers; and
wherein the first compound is attached as a side chain on the polymer segments.

5. The smart window of any of the examples 1-4, wherein the solid polymer film:
has a phase transition property due to crystal melting or re-crystallization of the phase changing moiety, and
has the transition temperature in a range including temperatures of no more than 20° C.

6. The smart window of any of the examples 1-5, wherein the solid polymer film comprises a first moiety 102 that is relatively hydrophobic and a second moiety 104 that is relatively hydrophilic, and the first moiety is more hydrophobic than the second moiety.

7. The smart window of example 6, wherein the second moiety 104 can be selected from the group comprising ethoxylated acrylate, ethoxylated trimethylolpropane triacrylate, poly(ethylene glycol) diacrylate, ethoxylated methacrylate, ethoxylated trimethylolpropane trimethacrylate, and poly(ethylene glycol) dimethacrylate.

8. The smart window of any of the examples 1-7, wherein the solid polymer film is prepared by copolymerization of octadecyl acrylate and ethoxylated trimethylolpropane triacrylate.

9. The smart window of example 8, wherein the solid polymer film has a weight ratio of the octadecyl acrylate to the ethoxylated trimethylolpropane triacrylate selected in the range between 1:1 and 6:1.

10. The smart window of any of the examples 1-8, wherein the copolymerization is by a means of ultraviolet (UV) exposure or heating.

11. The smart window of example 6, wherein:
a) the first moiety 102 and the second moiety 104 are phase separated in the solid polymer film so as to form two phases, and
b) at least one of the phases has phase grains larger than 1 micrometer.

12. The smart window of example 6 or 11, wherein the first moiety and the second moiety
a) have matching refractive indices (e.g, within 0.5% of each other) above the solid polymer film's transition temperature, and
b) have refractive indices with large difference (e.g., more than 1% different from each other) below the solid polymer film's transition temperature.

13. The smart window of any of the examples 1-12, wherein the solid polymer film comprises at least two separated phases 102, 104, and the opacity switching between the solid polymer film being transparent and the solid polymer film being opaque is caused by a reversible phase transition property of one of the separated phases 102.

14. The smart window of example 13, comprising a high transparency of at least 90% above the transition temperature due to the matching refractive indices of the two different separated phases.

15. The smart window of any of the examples 1-14, wherein a thickness T of the solid polymer film is selected in the range from 10 micrometers to 10 millimeters.

16. The smart window of any of the examples 1-15, wherein the heater is transparent with parallel transparency in the range of 80% to 100%. In some examples of example 16, the parallel transparency is $100 \times I_{out}/I_{in}$, where $I_{in}$ is the intensity of the incident light incident on the solid polymer film and $I_{out}$ is the intensity of the light transmitted through the film and measured on the other side along one or more direction within 5 degrees of the direction of the incident light $I_{in}$, and the parallel transparency in the range of 80%-100% is measured for all (or a subset of) wavelengths of solar radiation/sunlight or in a range of 500 nm to 2000 nm.

17. The smart window of any of the examples 1-16, wherein the heater comprises a transparent conductive layer 400, 704 that is deposited by printing, spraying, casting, physical vapor deposition, or chemical vapor deposition.

18. The smart window of example 17, wherein the transparent conductive layer comprises at least one of transparent conductive material 402 including an ultrathin metal coating, metal nanowires 402, carbon nanotubes, graphene, or indium tin oxide.

19. The smart window of examples 17 or 18, wherein the transparent conductive layer is:
a) deposited on the solid polymer film 702 comprising the phase changing moiety 102,
b) deposited on a transparent rigid substrate 404, including a glass sheet or an acrylic sheet,
c) deposited on a transparent flexible substrate 404, including ultrathin glass and one or more transparent polymer films, or
d) comprises a material 402 (e.g., nanowires) embedded in a transparent flexible substrate including one or more polymer films 412.

20. The smart window of any of the examples 17-19, wherein the transparent heater is heated when a voltage is applied between two separated points on the transparent conductive layer.

21. The smart, window of any of the examples 1-20, wherein the smart window:
a) is used as a thin sheet or conformed on a flat or curved surface,
b) is opaque at the ambient temperature,
c) is electrically controlled to become transparent when heated above a transition temperature,
d) has the transparency maintained with continuous heating, and
e) has the opacity reversed when the heater is switched off 22. A method of fabricating the transparent conductive layer of examples 17-21, comprising:
a) depositing a conductive material coating 402 on a release substrate 404;
b) applying a polymer precursor layer 408 (monomer precursor for the SW film or a different precursor, e.g., PUA) over the conductive material coating 402;

c) curing the polymer precursor layer 408 to form a heater comprising the solid polymer film 702 (comprising the phase changing moiety) or a second different solid polymer film 412 (e.g., PUA); and d) separating the cured second solid polymer film 412 or solid polymer film 702, SW from the release substrate 404, so that the transparent conductive layer 704 comprises an embedded conductive layer 402. Thus, for example, the polymer to embed the heater electrode may be the SW film or a different polymer such as PUA.

23. A method to make the smart window of any of the examples 1-22, comprising:
    a) homogeneously mixing two different monomers so as to form a mixture;
    b) applying the mixture on top of the transparent heater;
    c) curing the mixture by or using ultraviolet UV light or heat so as to form the solid polymer film; and
    d) applying electrical contacts to the transparent heater 704.

24. A method to make the smart window of any of the examples 1-23, comprising:
    a) depositing a transparent conductive material 402 coating on a release substrate 404;
    b) homogeneously mixing two different monomers so as to form a mixture;
    c) applying the mixture on top of the transparent conductive material coating 402,
    d) curing the mixture by or using ultraviolet (UV) light or heat so as to form the solid polymer film 702, SW comprising a cured polymer film;
    e) separating the cured polymer film 702, SW, with the transparent conductive material coating 402 from the release substrate 404; and
    f) applying electrical contacts to the transparent conductive material coating.

25. A composition of matter 100, comprising:
    a first polymer 102 comprising a phase changing polymer that reversibly switches between a semi-crystalline state and an amorphous state with temperature; and
    a second polymer 104 combined with the first polymer, wherein the first polymer is more hydrophobic than the second polymer so that the second polymer and the first polymer are phase separated, wherein:
    the first polymer comprises first domains 106 having a largest dimension (e.g., largest width 108 and/or largest height) in a range of 2-10 micrometers and/or sized to scatter-infrared light through scattering,
    the first domains are separated from each other by second domains 110 comprising stripes or bands including the second polymer, and
    the stripes or bands have a largest dimension (e.g., largest width 112 and/or largest height) of less than 2 micrometers and/or are dimensioned to scatter visible electromagnetic radiation wavelengths through scattering, so that a surface 750 of the composition of matter has a roughness of at least 5 micrometers over an area of at least 1 cm by 1 cm (centimeter).

26. The composition of matter of example 25, wherein:
    the first polymer has a transition temperature above which the first polymer is in the amorphous state,
    the second polymer and the first polymer have matching refractive indices (within 5%) above the transition temperature; and
    the second polymer and the first polymer have refractive indices with a large difference (more than 50% difference) below the transition temperature.

27. The composition of matter of any of the examples 25-26 wherein the first polymer is:
    opaque with a parallel transmittance less than 50% at an ambient temperature and transparent at an elevated temperature, and
    transparent with the parallel transmittance greater than 50% at the elevated temperature; wherein the ambient temperature is 30° C. or less and the elevated temperature is above 30° C. In some examples of example 27, the parallel transmittance in is $I_{out}/I_{in}$, where $I_{in}$ is the intensity of the incident light incident on the solid polymer film and $I_{out}$ is the intensity of the light transmitted through the film and measured on the other side along one or more direction within 5 degrees of the direction of the incident light Iin, and the parallel transmittance greater than 50% in the transparent state and less than 50% in the opaque state is measured for all wavelengths of solar radiation/sunlight or all (or a subset of) wavelengths in a range of 500 nm to 2000 nm.

28. The composition of matter of any of the examples 25-27, wherein the first polymer comprises a first acrylate and the second polymer comprises a second acrylate, and the second polymer is an oligomer.

29. The composition of matter of any of the examples 25-28, wherein the composition comprises a copolymer consisting essentially of the first polymer and the second polymer, or the first polymer copolymerized with the second polymer.

30. The composition of matter of any of the examples 25-29, wherein the second polymer comprises a crosslinker crosslinking the first polymers.

31. The composition of matter of any of the examples 25-30, wherein the first polymer comprises:
    polymer chain segments comprising at least one compound selected from a polyacrylate, a polycaprolactone, poly(ethylene-vinyl acetate); a polyethylene, a poly(cyclooctene), a chlorinated polyethylene, chlorosulfonated polyethylene, and their copolymers or copolymers thereof; and
    hydrocarbon groups comprising a hexadecyl or a octadecyl, wherein the hydrocarbon groups are attached as side chains to the polymer chain segments.

32. The composition of matter of any of the examples 25-31, wherein the second polymer comprises at least one compound selected from ethoxylated acrylate, ethoxylated trimethylolpropane tri acrylate, poly(ethylene glycol) diacrylate, ethoxylated methacrylate, ethoxylated trimethylolpropane trimethacrylate, and poly(ethylene glycol) dimethacrylate.

33. The composition of matter of any of the examples 25-32, comprising a weight ratio of the first polymer to the second polymer in a range of 1:1 to 6:1.

34. The composition of matter of any of the examples 25-33, wherein a weight ratio of the first polymer to the second polymer is tailored so the domains of the first polymer are semicrystalline and the composition of matter Mie scatters infrared light comprising the infrared wavelengths.

35. The composition of matter of any of the examples 25-34, cast using solution processing on a substrate.

36. The composition of matter of any of the examples 25-32, wherein the first polymer and the second polymer are homogenously mixed using a solution.

37. The composition of matter of examples 25-36, comprising a solid state homogenous mixture of the first polymer and the second polymer.

38. The composition of matter or smart window of any of the examples 1-37, wherein the parallel transmittance of the solid polymer film when the polymer solid film is opaque is at least 70% lower as compared to the parallel transmittance of the solid polymer film when the solid polymer film is transparent at the elevated temperature, for all wavelengths of solar radiation or sunlight, or for all (or a subset of) wavelengths in a range of 500 nm-2000 nm.

Advantages and Improvements

The global issues of climate change and the rapidly escalating energy consumption have inspired developments in the efficiency of energy usage. Utilizing smart windows' tunable opacity to control both the timing and amount of light transmission would have a direct reduction in the overall demand for air conditioning and heating. Smart windows can also be deployed in business and household rooms to improve privacy protection.

Three different technologies have been developed for smart windows: photochromic, electrochromic and thermochromic technologies. Currently available photochromic, electrochromic, and thermochromic smart window materials have limited bandwidth modulation, have short lifetimes, and/or must undergo complex production methods.

Photochromic-based smart windows can be operated with narrow light frequency switching, which is not a desirable feature. Their absorbance mechanism hinders a wide-range bandwidth switch that covers the whole spectrum from UV to near infrared (NIR) light. Moreover, the absorption at a certain wavelength range usually results in a fixed color for dark or transparent states of the smart windows, which is undesirable for general applications.

Electrochromic smart windows utilize the insertion and extraction of electrons in electrochemical redox reactions of the host materials to change colors. The switching speed depends on the active device area, diffusion length, and coefficient of electrolyte ions. The switching time of large-area electrochromic windows can take up to 10 minutes for practical usage. Electrochromic windows overall share the same issue with photochromic windows in that they have fixed colorations at either the transparent state, dark state, or both.

More critically, electrochromic windows have complicated structures, limited cycle lifetime, and excessive sealant due to the use of liquid electrolytes.

Traditional VO2-based smart windows can change colors due to a metal-insulator transition at critical temperatures, but these materials have low transmittance at visible light range for the transparent state, low oxidation resistance, and high cost for fabrication. Hydrogel-based thermochromic smart windows take advantage of hydrogels' phase separation property to enable a wide modulation wavelength range and high transmittance modulation contrast. However, the inclusion of water in a hydrogel-based thermochromic smart window hinders the cyclic stability due to water evaporation. Thermochromic polymer-dispersed or polymer-stabilized liquid crystals suffer from having a limited bandwidth due to their fixed pitches. Cholesteric liquid crystals or stacked liquid crystals with various pitches were used to enable large bandwidth switching, but they are expensive for large area applications in buildings.

Here we introduce a new wide bandwidth thermochromic smart window (SW) material based on a phase change polymer that can be reversibly switched between an opaque semicrystalline state and a transparent amorphous state. This reported solution processed fabrication procedure delivers a faster and simpler way to construct smart windows. Embodiments comprising an all-solid SW film also have a long cycle lifetime when compared to hydrogels due to elimination of the water evaporating problem.

Moreover, the present disclosure reports on the first utilization of a three-fold mechanism to fabricate an all-solid wide-bandwidth thermochromic smart window device without the inclusion of any metal/metal oxide nanoparticles or liquid crystals through a facile solution processed procedure. The opacity switching capability of the smart window comes from three aspects: the reversible crystalline-to-amorphous transition of one constituent polymer allows the repeatability switching of the film, micro-phase separation between the two polymer components provides high opacity over the whole solar spectrum at opaque state, and the matching refractive indices of the two components assures the transparency at transparency state. The all solution processed smart window can be switched among a wide light bandwidth and obtains a large luminance transmittance modulation of 80.4% and solar transmittance modulation of 70.2%, which is still functioning on curved surfaces. The free-of-liquid smart window also facilitates the long cycle lifetime. This smart window can be used to conserve the hot/cold air within buildings during winter/summer, as well as protect users' privacy at will.

REFERENCES

The following references are incorporated by reference herein.

1 Richter, B. G., David; Crabtree, George; Glicksman, Leon; Goldstein, David; Greene, David; Kammen, Dan; Levine, Mark; Lubell, Michael; Savitz, Maxine; Sperling, Daniel; Schlachter, Fred; Scofield, John; Dawson, James. How America can look within to achieve energy security and reduce global warming. *Rev. Mod. Phys.* 80, S1-S109, doi:10.1103/RevModPhys.80.S1 (2008).

2 Davy, N. C. et al. Pairing of near-ultraviolet solar cells with electrochromic windows for smart management of the solar spectrum. *Nature Energy* 2, 17104 (2017).

3 Li, X.-H., Liu, C., Feng, S.-P. & Fang, N. X. Broadband Light Management with Thermochromic Hydrogel Microparticles for Smart Windows. *Joule* 3, 290-302 (2019).

4 Long, L. & Ye, H. How to be smart and energy efficient: A general discussion on thermochromic windows. *Scientific reports* 4, 6427 (2014).

5 Yoshikawa, R., Tenjimbayashi, M. & Shiratori, S. Electrothermally Triggered Broadband. Optical Switch Films with Extremely Low Power Consumption. *ACS Applied Energy Materials* 1, 1429-1434 (2018).

6 Joost, U. et al. Reversible Photodoping of TiO2 Nanoparticles for Photochromic Applications. *Chemistry of Materials* 30, 8968-8974 (2018).

7 Ke, Y. et al. Vanadium dioxide: The multistimuli responsive material and its applications. *Small* 14, 1802025 (2018).

8 Cao, D., Xu, C., Lu, W., Qin, C. & Cheng. S. Sunlight-Driven Photo-Thermochromic Smart Windows. *Solar RRL* 2, 1700219 (2018).

9 Bella, F. et al. A new design paradigm for smart windows: photocurable polymers for quasi-solid photoelectrochromic devices with excellent long-term stability under real outdoor operating conditions. *Advanced Functional Materials* 26, 1127-1137 (2016).

10 Najafi-Ashtiani, H., Gholipour, S. & Randar, A. Surface plasmon resonance effect for a new structure of Ag/WO3 nanorod-shell nanocomposites and application in smart window. *Journal of Molecular Structure* 1169, 25-30 (2018).

11 Nguyen, T. D. et al. Efficient Near Infrared Modulation with High Visible Transparency Using SnO2-MO3 Nanostructure for Advanced Smart Windows. *Advanced Optical Materials,* 1801389 (2019).

12 Zhao, Q. et al. Printing of WO3/ITO nanocomposite electrochromic smart windows. Solar Energy Materials and Solar Cells 194, 95-102 (2019).

13 Wang, Z. et al. Pairing of Luminescent Switch with Electrochromism for Quasi-Solid-State Dual-Function Smart Windows. *ACS applied materials & interfaces* 10, 31697-31703 (2018).

14 Zhou, Y. et al. Fully printed flexible smart hybrid hydrogels. *Advanced Functional Materials* 28, 1705365 (2018).

15 Singh, A. K, Kiruthika, S., Mondal, I. & Kulkarni, G. U. Fabrication of solar and electrically adjustable large area smart windows for indoor light and heat modulation. *Journal of Materials Chemistry C* 5, 5917-5922 (2017).

16 La, T.-G. et al. Highly flexible, multipixelated thermosensitive smart windows made of tough hydrogels. *ACS applied materials & interfaces* 9, 33100-33106 (2017).

17 Kiruthika, S. & Kulkarni, G. Energy efficient hydrogel based smart windows with low cost transparent conducting electrodes. *Solar Energy Materials and Solar Cells* 163, 231-236 (2017).

18 Liang, X. et al Dual-band modulation of visible and near-infrared light transmittance in an all-solution-processed hybrid micro-nano composite film. *ACS applied materials & interfaces* 9, 40810-40819 (2017).

19 Liang, X. et al. A temperature and electric field-responsive flexible smart film with full broadband optical modulation. *Materials horizons* 4, 878-884 (2017).

20 Liu, T. et al. Smart window coating based on F-TiO 2-K×WO 3 nanocomposites with heat shielding, ultraviolet isolating, hydrophilic and photocatalytic performance. *Scientific reports* 6, 27373 (2016).

21 Tani, T., Hakuta., S., Kiyoto, N. & Naya., M. Transparent near-infrared reflector metasurface with randomly dispersed silver nanodisks. *Optics express* 22, 9262-9270 (2014).

22 Cai, G., Eh, A. L. S., Ji, L. & Lee, P. S. Recent advances in electrochromic smart fenestration. *Advanced Sustainable Systems* 1, 1700074 (2017).

23 Ke, Y. et al. Emerging thermal-responsive materials and integrated techniques targeting the energy-efficient smart window application. *Advanced Functional Materials* 28, 1800113 (2018).

24 Li, M., Magdassi, S., Gao, Y. & Long, Y. Hydrothermal synthesis of VO2 polymorphs: advantages, challenges and prospects for the application of energy efficient smart windows. *Small* 13, 1701147 (2017).

25 Wang, N. et al. Terbium-doped VO2 thin films: reduced phase transition temperature and largely enhanced luminous transmittance. Langmuir 32, 759-764 (2016).

26 Khandelwal, H., Schenning, A. P. & Debije, M. G. Infrared regulating smart window based on organic materials. *Advanced Energy Materials* 7, 1602209 (2017).

27 Lee, H. Y. et al. Thermochromic ionogel: a new class of stimuli responsive materials with super cyclic stability for solar modulation. *Chemistry of Materials* 29, 6947-6955 (2017).

28 Zhang, L. et al. Polymeric infrared reflective thin films with ultra-broad bandwidth. *Liquid Crystals* 43, 750-757 (2016).

29 Lee, K. M. et al. Color-tunable mirrors based on electrically regulated bandwidth broadening in polymer-stabilized cholesteric liquid crystals. *ACS Photonics* 1, 1033-1041 (2014).

30 Meng, Y., Jiang, J. & Anthamatten, M. Body temperature triggered shape-memory polymers with high elastic energy storage capacity. *Journal of Polymer Science Part B: Polymer Physics* 54, 1397-1404 (2016).

31 Zhou, Y., Cai, Y., Hu, X. & Long, Y. VO 2/hydrogel hybrid nanothermochromic material with ultra-high solar modulation and luminous transmission. *Journal of Materials Chemistry A* 3, 1121-1126 (2015).

32 Zhou, Y., Cai, Y., Flu, X. & Long, Y. Temperature-responsive hydrogel with ultra-large solar modulation and high luminous transmission for "smart window" applications. *Journal of Materials Chemistry A* 2, 13550-13555 (2014).

33 SD, J. & YM, L. Microemulsion-based synthesis of V1-xWxO2@ SiO2 core-shell structures for smart window applications. *J. Mater. Chem. C* 2, 3812-3819 (2014).

34 Dai, L. et al. F-doped VO 2 nanoparticles for thermochromic energy-saving foils with modified color and enhanced solar-heat shielding ability. *Physical Chemistry Chemical Physics* 15, 11723-11729 (2013).

35 Zhu, J. et al. Hybrid films of VO 2 nanoparticles and a nickel (ii)-based ligand exchange thermochromic system: excellent optical performance with a temperature responsive colour change. *New Journal of Chemistry* 41, 830-835 (2017).

36 Shen, N. et al. The synthesis and performance of Zr-doped and W—Zr-codoped VO2 nanoparticles and derived flexible foils. *Journal of Materials Chemistry A* 2, 15087-15093 (2014).

37 Liu, C. et al. Index-tunable anti-reflection coatings: Maximizing solar modulation ability for vanadium dioxide-based smart thermochromic glazing. *Journal of Alloys and Compounds* 731, 1197-1207 (2018).

38 Zhu, J. et al. Composite Film of Vanadium Dioxide Nanoparticles and ionic Liquid-Nickel-Chlorine Complexes with Excellent Visible Thermochromic Performance. *ACS applied materials & interfaces* 8, 29742-29748 (2016).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A composition of matter, comprising:
   a solid polymer film which is opaque at an ambient temperature and transparent above an elevated temperature, wherein:
   the solid polymer film includes a copolymer comprising a first polymer crosslinked with a second polymer, the first polymer comprising a phase changing moiety that reversibly switches by a phase change between a semi-crystalline state and an amorphous state at the elevated temperature; and wherein the first polymer is more hydrophobic than the second polymer so that the second polymer and the first polymer are phase separated, the phase changing moiety has a refractive index changing by at least 0.01 during the phase change, and the phase change is reversed when the temperature of the solid polymer film is lowered to the ambient temperature.

2. The composition of matter of claim 1, wherein the solid polymer film:

is opaque at the ambient temperature with a parallel transmittance less than 50%;

becomes transparent at the elevated temperature with a parallel transmittance greater than 50%, and has a transition temperature that is greater than 30° C. and less than 130° C., wherein the transition temperature is the temperature at which the solid polymer film changes from being opaque to being transparent.

3. A window comprising the composition of matter of claim 1.

4. The composition of matter of claim 1, wherein the phase changing moiety comprises:

at least one first compound selected from the group consisting of or comprising hydrocarbon groups including hexadecyl and octadecyl, and polymer chain segments selected from the group consisting of or including polyacrylate, polycaprolactone, poly(ethylene-vinyl acetate), polyethylene, poly(cyclooctene), chlorinated polyethylene, chlorosulfonated polyethylene, and their copolymers, and wherein the first compound is attached as a side chain on the polymer segments.

5. The composition of matter of claim 4, wherein the solid polymer film:

has a phase transition property due to crystal melting or re-crystallization of the phase changing moiety, and has the transition temperature in a range including temperatures of no more than 20° C.

6. The composition of matter of claim 1, wherein the second polymer is relatively hydrophilic.

7. The composition of matter of claim 1, wherein second polymer comprises at least one of ethoxylated acrylate, ethoxylated trimethylolpropane triacrylate, poly(ethylene glycol) diacrylate, ethoxylated methacrylate, ethoxylated trimethylolpropane trimethacrylate, or poly(ethylene glycol) dimethacrylate.

8. The composition of matter of claim 1, wherein the solid polymer film is prepared by copolymerization of octadecyl acrylate and ethoxylated trimethylolpropane triacrylate.

9. The composition of matter of claim 8, wherein the solid polymer film has a weight ratio of the octadecyl acrylate to the ethoxylated trimethylolpropane triacrylate selected in the range between 1:1 and 6:1.

10. The composition of matter of claim 7, wherein at least one of the phases has phase grains larger than 1 micrometer.

11. The composition of matter of claim 7, wherein the first polymer and the second polymer:

a) have matching refractive indices within 0.5% of each other above the solid polymer film's transition temperature, and b) have refractive indices with a difference below the solid polymer film's transition temperature.

12. A window comprising the composition of matter of claim 1, comprising a high transparency of at least 90% above the elevated temperature due to the matching refractive indices of the two different separated phases.

13. A window comprising the composition of matter of claim 1, further comprising:

a transparent heater to supply uniform heating to at least a part of the solid polymer film; and a power supply connected to the transparent heater; and wherein the heater is transparent with parallel transparency in the range of 80% to 100%.

14. A window comprising the composition of matter of claim 1, further comprising:

a transparent heater to supply uniform heating to at least a part of the solid polymer film; and a power supply connected to the transparent heater; and wherein the heater comprises a transparent conductive layer that is deposited by printing, spraying, casting, physical vapor deposition, or chemical vapor deposition.

15. The window of claim 14, wherein the transparent conductive layer comprises at least one of transparent conductive material including an ultrathin metal coating, metal nanowires, carbon nanotubes, graphene, or indium tin oxide.

16. The window of claim 13, wherein the window:

a) is used as a thin sheet or conformed on a flat or curved surface, b) is opaque at the ambient temperature, c) is electrically controlled to become transparent when heated above a transition temperature, d) has the transparency maintained with continuous heating, and e) has the opacity reversed when the heater is switched off.

17. The window of claim 13, manufactured using a process comprising:

a) depositing a transparent conductive material coating on a release substrate;

b) homogeneously mixing two different monomers so as to form a mixture;

c) applying the mixture on top of the transparent conductive material coating, d) curing the mixture by or using ultraviolet (UV) light or heat so as to form the solid polymer film comprising a cured polymer film;

e) separating the cured polymer film with the transparent conductive material coating from the release substrate; and f) applying electrical contacts to the transparent conductive material coating.

18. A window comprising the composition of matter of claim 1, further comprising:

a transparent heater to supply uniform heating to at least a part of the solid polymer film; and a power supply connected to the transparent heater.

19. The composition of matter of claim 1, wherein the first polymer comprises a first acrylate and the second polymer comprises a second acrylate and is an oligomer.

20. The composition of matter of claim 19, wherein the solid polymer film comprises the copolymer consisting essentially of the first polymer and the second polymer, or the first polymer copolymerized with the second polymer, and wherein the second polymer comprises a crosslinker crosslinking the first polymer.

21. The composition of matter of claim 1, wherein the solid polymer film comprises:

the first polymer comprising the phase changing moiety comprising:

polymer chain segments comprising at least one of a polyacrylate, a polycaprolactone, poly(ethylene-vinyl acetate), a polyethylene, a poly(cyclooctene), a chlorinated polyethylene, chlorosulfonated polyethylene, or a copolymer thereof; and hydrocarbon groups comprising a hexadecyl or a octadecyl, wherein the hydrocarbon groups are attached as side chains to the polymer chain segments; and the second polymer comprising a compound comprising at least one of an ethoxylated acrylate, an ethoxylated trimethylolpropane triacrylate, a poly(ethylene glycol) diacrylate, an ethoxylated methacrylate, an ethoxylated trimethylolpropane trimethacrylate, or a poly(ethylene glycol) dimethacrylate.

22. A composition of matter, comprising:

a first polymer comprising a phase changing polymer that reversibly switches between a semicrystalline state and an amorphous state with temperature; and a second polymer crosslinked with the first polymer, wherein the first polymer is more hydrophobic than the second polymer so that the second polymer and the first polymer are phase separated, wherein:

the first polymer comprises first domains having a width and height in a range of 2-10 micrometers and/or sized to scatter infrared electromagnetic radiation through scattering, the first domains are separated from each other by second domains comprising stripes or bands including the second polymer, and the stripes or bands have a width and height of less than 2 micrometers and/or are dimensioned to scatter visible electromagnetic radiation wavelengths through scattering, so that a surface of the composition of matter has a roughness of at least 5 micrometers over an area of at least 1 cm by 1 cm.

23. A method of making a composition of matter, comprising:

copolymerizing a mixture of two monomers to form a solid polymer film which is opaque at an ambient temperature and transparent above an elevated temperature, wherein:

the solid polymer film includes a copolymer comprising a first polymer crosslinked with a second polymer, the first polymer comprising a phase changing moiety that reversibly switches by a phase change between a semicrystalline state and an amorphous state at the elevated temperature; and wherein the first polymer is more hydrophobic than the second polymer so that the second polymer and the first polymer are phase separated, the phase changing moiety has a refractive index changing by at least 0.01 during the phase change, and the phase change is reversed when the temperature of the solid polymer film is lowered to the ambient temperature.

* * * * *